United States Patent
Kirn et al.

(10) Patent No.: US 11,416,573 B2
(45) Date of Patent: Aug. 16, 2022

(54) BUNDLED SCRIPTS FOR WEB CONTENT DELIVERY

(71) Applicant: ServiceNow, Inc., Santa Clara, CA (US)

(72) Inventors: Andreas Kirn, San Diego, CA (US); Darren Michael Richards, Oceanside, CA (US); Jason Strimpel, San Diego, CA (US); Carl Solis, Purcellville, VA (US); Christopher Tucker, Chula Vista, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 17/027,292

(22) Filed: Sep. 21, 2020

(65) Prior Publication Data

US 2021/0004525 A1    Jan. 7, 2021

Related U.S. Application Data

(63) Continuation of application No. 16/007,775, filed on Jun. 13, 2018, now Pat. No. 10,783,316, which is a
(Continued)

(51) Int. Cl.
*G06F 17/10*    (2006.01)
*G06F 16/957*    (2019.01)
(Continued)

(52) U.S. Cl.
CPC ........ *G06F 16/9574* (2019.01); *G06F 40/117* (2020.01); *G06F 40/137* (2020.01); *G06F 40/143* (2020.01)

(58) Field of Classification Search
CPC .. G06F 16/9574; G06F 40/137; G06F 40/143; G06F 40/117
See application file for complete search history.

(56) References Cited

U.S. PATENT DOCUMENTS

| 5,761,673 A | 6/1998 | Bookman et al. |
| 6,014,138 A | 1/2000 | Cain et al. |

(Continued)

FOREIGN PATENT DOCUMENTS

| AU | 2019201345 | 6/2020 |
| CA | 3034400 | 8/2019 |

(Continued)

OTHER PUBLICATIONS

Cannon, Ada Rose, "Lessons Learned, making our app with Web Components," Jan. 23, 2018 (available at https://web.archive.org/web/20180123164519/https://medium.com/samsung-internet-dev/lessons-learned-making-our-app-with-web-components-bf55379cfcda) (last accessed Mar. 13, 2020) (Year: 2018).

(Continued)

*Primary Examiner* — Shahid K Khan
(74) *Attorney, Agent, or Firm* — Fletcher Yoder PC

(57) ABSTRACT

A web server application executable on a computing device is configured to receive from a web browser application executing on a client device a request for the web page and, responsive to the request, to (i) identify, based on information in the request, a plurality of scripts defining structure and operation of components of the web page, (ii) bundle the identified scripts into a bundle of scripts, (iii) generate a markup document representing the requested web page and including in the markup document a reference to the bundle of scripts, wherein the reference to the bundle of scripts being useable by the web browser application as a basis to retrieve the plurality of scripts in rendering the web page, and (iv) output the generated markup document in a response for transmission to the client device.

20 Claims, 19 Drawing Sheets

Related U.S. Application Data continuation of application No. 15/972,561, filed on May 7, 2018, now Pat. No. 10,599,752.

(60) Provisional application No. 62/635,161, filed on Feb. 26, 2018.

(51) Int. Cl.
*G06F 40/117* (2020.01)
*G06F 40/137* (2020.01)
*G06F 40/143* (2020.01)

(56) References Cited

U.S. PATENT DOCUMENTS

| | | | |
|---|---|---|---|
| 6,321,229 B1* | 11/2001 | Goldman | G06F 16/9027 |
| 6,609,122 B1 | 8/2003 | Ensor | |
| 6,678,887 B1 | 1/2004 | Hallman | |
| 6,804,686 B1* | 10/2004 | Stone | G06F 8/10 |
| 6,951,014 B1 | 9/2005 | Sokolov | |
| 7,020,706 B2 | 3/2006 | Cates | |
| 7,028,301 B2 | 4/2006 | Ding | |
| 7,062,683 B2 | 6/2006 | Warpenburg | |
| 7,131,037 B1 | 10/2006 | LeFaive | |
| 7,170,864 B2 | 1/2007 | Matharu | |
| 7,207,000 B1* | 4/2007 | Shen | G06F 40/154 707/999.01 |
| 7,480,921 B1 | 1/2009 | Vigesaae et al. | |
| 7,533,365 B1* | 5/2009 | Hogstrom | G06F 8/10 717/106 |
| 7,610,512 B2 | 10/2009 | Gerber | |
| 7,617,073 B2 | 11/2009 | Trinon | |
| 7,636,873 B2 | 12/2009 | Lacombe et al. | |
| 7,689,628 B2 | 3/2010 | Garg | |
| 7,716,353 B2 | 5/2010 | Golovinsky | |
| 7,769,718 B2 | 8/2010 | Murley | |
| 7,783,744 B2 | 8/2010 | Garg | |
| 7,890,802 B2 | 2/2011 | Gerber | |
| 7,925,981 B2 | 4/2011 | Pourheidar | |
| 7,930,396 B2 | 4/2011 | Trinon | |
| 7,945,860 B2 | 5/2011 | Vambenepe | |
| 7,966,398 B2 | 6/2011 | Wiles | |
| 8,051,164 B2 | 11/2011 | Peuter | |
| 8,104,044 B1 | 1/2012 | Scofield et al. | |
| 8,150,939 B1 | 4/2012 | Murray | |
| 8,151,261 B2 | 4/2012 | Sirota | |
| 8,224,683 B2 | 7/2012 | Manos | |
| 8,266,096 B2 | 9/2012 | Navarrete | |
| 8,402,127 B2 | 3/2013 | Solin | |
| 8,457,928 B2 | 6/2013 | Dang | |
| 8,478,569 B2 | 7/2013 | Scarpelli | |
| 8,612,408 B2 | 12/2013 | Trinon | |
| 8,646,093 B2 | 2/2014 | Myers | |
| 8,674,992 B2 | 3/2014 | Poston | |
| 8,689,241 B2 | 4/2014 | Naik | |
| 8,743,121 B2 | 6/2014 | De Peuter | |
| 8,832,652 B2 | 9/2014 | Mueller | |
| 8,887,133 B2 | 11/2014 | Behnia | |
| 8,983,982 B2 | 3/2015 | Rangarajan | |
| 9,064,029 B2 | 6/2015 | D'Angelo et al. | |
| 9,065,783 B2 | 6/2015 | Ding | |
| 9,098,322 B2 | 8/2015 | Apte | |
| 9,122,552 B2 | 9/2015 | Whitney | |
| 9,239,857 B2 | 1/2016 | Trinon | |
| 9,317,327 B2 | 4/2016 | Apte | |
| 9,363,252 B2 | 6/2016 | Mueller | |
| 9,508,051 B2 | 11/2016 | Falk | |
| 9,535,674 B2 | 1/2017 | Cooper | |
| 9,535,737 B2 | 1/2017 | Joy | |
| 9,557,969 B2 | 1/2017 | Sharma | |
| 9,645,833 B2 | 5/2017 | Mueller | |
| 9,654,473 B2 | 5/2017 | Miller | |
| 9,766,935 B2 | 9/2017 | Kelkar | |
| 9,792,387 B2 | 10/2017 | George | |
| 9,805,322 B2 | 10/2017 | Kelkar | |
| 10,599,752 B2 | 3/2020 | Kim et al. | |
| 10,628,630 B1* | 4/2020 | Surace | G06K 9/6267 |
| 10,657,292 B2 | 5/2020 | Trimberger | |
| 10,783,316 B2 | 9/2020 | Kim et al. | |
| 10,824,791 B2 | 11/2020 | Solis | |
| 2002/0038319 A1* | 3/2002 | Yahagi | G06F 40/151 707/999.1 |
| 2002/0049788 A1 | 4/2002 | Lipkin et al. | |
| 2002/0083097 A1 | 6/2002 | Warrington | |
| 2002/0103856 A1 | 8/2002 | Hewett et al. | |
| 2002/0104068 A1* | 8/2002 | Barrett | G06F 8/24 717/162 |
| 2002/0143521 A1* | 10/2002 | Call | G06F 40/143 704/1 |
| 2002/0147763 A1* | 10/2002 | Lee | G06F 9/465 709/202 |
| 2003/0004697 A1 | 1/2003 | Ferris | |
| 2003/0008684 A1 | 1/2003 | Ferris | |
| 2003/0014442 A1 | 1/2003 | Shiigi et al. | |
| 2003/0014611 A1 | 1/2003 | Ferris | |
| 2003/0051022 A1 | 3/2003 | Sogabe et al. | |
| 2003/0101255 A1* | 5/2003 | Green | G06F 11/2294 709/218 |
| 2003/0126311 A1 | 7/2003 | Kushnirskiy et al. | |
| 2003/0225853 A1 | 12/2003 | Wang et al. | |
| 2004/0015476 A1 | 1/2004 | Twaddle | |
| 2004/0015834 A1* | 1/2004 | Mestre | G06F 8/10 717/114 |
| 2004/0148569 A1* | 7/2004 | Sengodan | G06F 40/117 715/239 |
| 2004/0268240 A1* | 12/2004 | Vincent, III | G06F 40/186 715/234 |
| 2005/0273758 A1 | 12/2005 | Long | |
| 2006/0064422 A1 | 3/2006 | Arthurs et al. | |
| 2006/0218000 A1 | 9/2006 | Smith et al. | |
| 2006/0225032 A1 | 10/2006 | Klerk et al. | |
| 2007/0101291 A1 | 5/2007 | Forstall et al. | |
| 2007/0204213 A1 | 8/2007 | McMahan et al. | |
| 2007/0255715 A1 | 11/2007 | Li et al. | |
| 2008/0034071 A1 | 2/2008 | Wilkinson et al. | |
| 2008/0098028 A1 | 4/2008 | Shan et al. | |
| 2008/0109715 A1* | 5/2008 | Stover | G06F 16/958 707/999.102 |
| 2008/0201118 A1* | 8/2008 | Luo | G06F 16/958 703/2 |
| 2009/0013244 A1 | 1/2009 | Cudich et al. | |
| 2009/0138792 A1* | 5/2009 | Cudich | G06F 40/10 715/234 |
| 2009/0144753 A1* | 6/2009 | Morris | G06F 40/169 719/318 |
| 2010/0199257 A1 | 8/2010 | Biggerstaff | |
| 2011/0055683 A1 | 3/2011 | Jiang | |
| 2011/0161991 A1 | 6/2011 | Graham et al. | |
| 2012/0096429 A1 | 4/2012 | Desai et al. | |
| 2012/0317486 A1 | 12/2012 | Loew et al. | |
| 2013/0104067 A1 | 4/2013 | Sullivan et al. | |
| 2013/0132809 A1 | 5/2013 | Tseng et al. | |
| 2013/0239126 A1 | 9/2013 | Sun | |
| 2014/0047318 A1 | 2/2014 | Glazkov | |
| 2014/0237486 A1 | 8/2014 | Zhang et al. | |
| 2014/0310591 A1 | 10/2014 | Nguyen et al. | |
| 2015/0193512 A1 | 7/2015 | No et al. | |
| 2015/0363504 A1 | 12/2015 | D-Angelo et al. | |
| 2017/0235848 A1 | 8/2017 | Van Dusen et al. | |
| 2017/0344656 A1 | 11/2017 | Koren et al. | |
| 2018/0032627 A1 | 2/2018 | Margatan | |
| 2018/0052809 A1 | 2/2018 | Nguyen et al. | |
| 2018/0052811 A1 | 2/2018 | Gonzalez et al. | |
| 2018/0183815 A1 | 6/2018 | Enfinger | |
| 2018/0260745 A1 | 9/2018 | Jana et al. | |
| 2018/0295494 A1 | 10/2018 | Meau et al. | |
| 2018/0323983 A1* | 11/2018 | Sankarram | H04L 12/18 |
| 2019/0188419 A1 | 6/2019 | Trimberger | |

(56) References Cited

U.S. PATENT DOCUMENTS

2019/0303215 A1　　10/2019　Marchiori et al.
2021/0241191 A1*　 8/2021　Oara .................... G06Q 10/103

FOREIGN PATENT DOCUMENTS

| EP | 3531304 | 8/2019 |
|---|---|---|
| EP | 3531306 | 8/2019 |
| EP | 3531305 | 10/2020 |
| JP | 2006285714 | 10/2006 |
| JP | 2011524030 | 8/2011 |
| JP | 2013524381 | 6/2013 |
| JP | 2014511525 | 5/2014 |
| JP | 6750054 | 9/2020 |
| WO | 03/024053 A2 | 3/2003 |
| WO | 2009132444 | 11/2009 |
| WO | 2011129989 | 10/2011 |
| WO | 2012109003 | 8/2012 |

OTHER PUBLICATIONS

Andrejs Abrickis, Modern Approach of JavaScript Bundling with Webpack, Feb. 13, 2017 (available at https://medium.com/better-programming./modern-approach-of-javascript-bundling-with-webpack-3b7b3e5f4e7) (Year: 2017).

Eclipse Community Forums, How to start bundles in proper order, Jan. 2012 (available at http://www.eclipse.org/forums/index.php/t/390247/) (Year: 2012).

Stack Overflow, ASP.NET MBC—Bundle Config Order, Oct. 11, 2013 (available at http://stackoverflow.com/questions/19323409/asp-net-mvc-bundle-config-order) (Years: 2013).

Bartoli et al., Graphical Design of Distributed Applications Through Reusable Components (Year: 1995).

"Web Components," printed from http://developer.mozilla.org/en-US/docs/Web/Web_Components on Apr. 25, 2018.

ServiceNow Support: "Service Portal—What's in a Portal", Mar. 14, 2017 (Mar. 14, 2017), p. 1, XP054979233, URL: https://www.youtube.com/watch?v=fkelStiYCNo (retrieved on Mar. 26, 2019).

ServiceNow Support: "Service Portal—Anatomy of a Widget", Mar. 31, 2017 (Mar. 31, 2017), p. 1, XP054979232, URL:https://www.youtube.com/watch?v_M11pUpc16TI (retrived on Mar. 26, 2019).

Anonymous: "Recommendations for developing widgets (Istandbul)", Aug. 31, 2017 (Aug. 31, 2017), pp. 1-2, XP055574306, URL:https://docs.servicenow.com/bundle/istanbul-servicenow-platform/page/build/service-portal/concept/widget-best-practices.html (retrieved on Mar. 26, 2019).

Anonymous: "asp.net—Runtime dynamic bundling and minifying in MVC4—Stack Overflow", Dec. 9, 2016 (Dec. 9, 2016), XP055572108, URL:https://web.archive.org/web/w20161209072648/https://stackoverflow.com/questions/10614441/runtime-dynamic-bundling-and-minifying-in-mvc-4 (retrieved on Mar. 20, 2019).

Unknown: "New Bundling and Minification Support (ASP.NET 4.5 Series)", Aug. 11, 2016 (Aug. 11, 2016), XP055572155, URL:https://web.archive.org/web/20160811001802/https://weblogs.asp.net/scottgu/new-bundling-and-minification-support-asp-net-4-5-series (received on Mar. 20, 2019).

* cited by examiner

FIG. 6

```
<sn-workspace-layout
        component-id="4b311797c33103000dc6914522d3ae5d">
    <sn-workspace-header
            component-id="9c721b97c33103000dc6914522d3ae36"
            slot="header"
            listen-to="searchAction:8c3408f1c30203000dc6914522d3ae37/GLOBAL_SEARCH_ACTION"
            cti-visibility>
        <sn-component-workspace-global-search-typeahead
                component-id="8c3408f1c30203000dc6914522d3ae37"
                slot="global-search"
                listen-to="*/GLOBAL_SEARCH_ACTION"></sn-component-workspace-global-search-typeahead>

</sn-workspace-header>
    <sn-workspace-toolbar
            component-id="063617d7c33103000dc6914522d3ae60"
            slot="layout-mode-buttons"
            listen-to="setTabsProps:def5d3d7c33103000dc6914522d3aed0/SET_TABS">
        <sn-component-workspace-openframe-header
                component-id="fc9e5d266712030056 16ebc172415a3a"
                slot="openframe-trigger"></sn-component-workspace-openframe-header>

</sn-workspace-toolbar>
    <sn-workspace-nav
            component-id="c55553d7c33103000dc6914522d3ae17"
            slot="left-nav"
            listen-to="toolbar:063617d7c33103000dc6914522d3ae60/LAYOUT_MODE_SELECTED">
        <sn-component-workspace-list-menu
                component-id="20868cf1c30203000dc6914522d3ae82"
                slot="list-menu"
                defer="true"></sn-component-workspace-list-menu>
        <sn-chat-queue-panel
                component-id="1256a9800b7203002ac50851c5673a6e"
                slot="list-queue"
                defer="true"></sn-chat-queue-panel>

</sn-workspace-nav>
    <sn-workspace-tabs
            component-id="def5d3d7c33103000dc6914522d3aed0"
            slot="primary-tabs"></sn-workspace-tabs>
    <sn-workspace-main
            component-id="421617d7c33103000dc6914522d3ae07"
            slot="main-content"
            listen-to="setTabsProps : def5d3d7c33103000dc6914522d3aed0/SET_TABS">
        <sn-workspace-sub-tabs
                component-id="9b5d0075c30203000dc6914522d3ae89"
                slot="secondary-tabs"
                listen-to="setTabsProps : def5d3d7c33103000dc6914522d3aed0/SET_TABS"
                defer="true"></sn-workspace-sub-tabs>
        <sn-workspace-content
                component-id="badd8075c30203000dc6914522d3ae2b"
                slot="content"
                listen-to="setTabsProps : def5d3d7c33103000dc6914522d3aed0/SET_TABS"
                defer="true">
            <sn-component-list
                    component-id="9c0e8075c30203000dc6914522d3ae9c"
                    slot="full-list"
                    listen-to="9c721b97c33103000dc6914522d3ae36/USER_PREFERENCE_UPDATE,
                        updateListMenuQuery:*/UPDATE_LIST_MENU_QUERY"></sn-component-list>

</sn-workspace-content>

</sn-workspace-main>
    <sn-component-openframe
            component-id="b10fdd266712030056 16ebc172415a5a"
            slot="openframe-cti"
            listen-to="communicationMeta:*/OPEN_PHONE,
                config: fc9e5d266712030056 16ebc172415a3a/OPENFRAME_CONFIG"
            position="bottom-left"></sn-component-openframe>

</sn-workspace-layout>
```

BUNDLED SCRIPTS FOR WEB CONTENT DELIVERY

CROSS-REFERENCE TO RELATED APPLICATIONS

This application is a continuation of U.S. patent application Ser. No. 16/007,775, filed Jun. 13, 2018; which is a continuation of U.S. patent application Ser. No. 15/972,561, filed May 7, 2018, which claims priority to U.S. Provisional Patent Application No. 62/635,161, filed Feb. 26, 2018. The entirety of each of these priority applications is hereby incorporated by reference.

BACKGROUND

When a web developer develops a web page, the developer may use a framework that relies upon underlying logic to drive components of the page. A representative framework may publish JavaScript libraries that define special application programming interfaces (APIs) useable to define aspects of web page structure and operation. In practice, when a web developer composes a hypertext markup language (HTML) document for a web page, the developer could place in the document a reference to such published JavaScript libraries and could write and include in the document sets of code that will call the JavaScript APIs to control structure and operation of the page in a desired manner when the page is rendered by a browser.

Unfortunately, however, providers of such web development frameworks may change the frameworks from time to time and/or may discontinue support for certain frameworks or framework versions. Further, such a framework or library may become outdated due to a lack of support for modern browsers (which could lead to buggy behavior and/or decreased performance). When this happens, a web developer may be forced to rewrite web pages that made use of the deprecated frameworks, writing new imperative code and making other changes to make use of newer, supported frameworks. But this process can be impractical, especially where the web pages at issue are highly complex.

SUMMARY

Disclosed is a system to help address this issue, enabling a web developer to compose a web page through use of web page components whose core structure and operation is defined by underlying script libraries that could be updated or changed by a provider of the system when desired, without necessitating rewrites of the page. The system could enable the web developer to compose such a page declaratively with markup that simply declares a desired hierarchical arrangement between specified components, without a need for the developer to engage in imperative coding to define the core structure and operation of the components. Further, the scripts underlying the components could be configured to support inter-component data binding, allowing components to be updated in response to published data related to other components. And the system could enable the web developer to declaratively specify desired data bindings between components on a page by including in the markup simple "listen-to" tag attributes or the like, again without the need for the developer to engage in associated imperative coding.

To help facilitate this, the system could further include a page-builder subsystem that efficiently represents and stores web page descriptions and dynamically constructs associated HTML documents for rendering by browsers.

In particular, the page-builder system could store descriptions of web pages as metadata in a relational database, with various interrelated tables defining hierarchical arrangement of, and data-binding between, components of the page. For instance, the system could provide an interface through which a web developer could design or compose a web page incorporating components as noted above, specifying the component hierarchy and data binding, and the system could respond to the developer's specifications by generating and storing associated database records to describe the page structure, including references to underlying script libraries that will drive the components.

The page-builder system could then respond to a browser's web page request by querying the database to establish the associated page structure and, based on the results of the querying, could dynamically construct an HTML document that includes applicable component declarations and references to the underlying script libraries. And the page-builder system could return the constructed HTML document, possibly together with the underlying script files, to the requesting browser for rendering. Because these HTML documents are constructed dynamically upon request, the underlying script libraries and associated references can be changed when desired without necessitating page rewrites, provided that the newly provided scripts would still support the developer-declared hierarchy, data-binding, and other parameters.

Accordingly, a first example embodiment may involve a computing device that includes a processing unit, data storage, and a web browser application stored in the data storage and executable by the processing unit to carry out various operations. The operations could include receiving, in response to a request for a web page, (i) declarative markup data defining a hierarchical arrangement of components of the web page, including at least first component and a second component, and (ii) a set of scripts defining structure and operation of the components of the web page, including first script defining structure and operation of the first component and second script defining structure and operation of the second component. Further, the operations could include establishing a document object model (DOM) of the web page, including populating, based on the received scripts, shadow DOMs of the components of the web page. And the operations could include rendering the web page based on the established DOM.

In line with the discussion above, the declarative markup data and scripts could cooperatively define data-binding between the first component and the second component (and similarly between other pairs of components, and likewise defining many-to-many relationships between components). For instance, the first script could be interpretable by the web browser application to cause the web browser application to dynamically publish data related to the first component (such as state data of the first component, and/or data that passes through or is emitted by the first component), the declarative markup data could include for the second component a listen-to tag attribute that binds logic (e.g., operations, properties, etc.) of the second component with the dynamically published data related to the first component, and the second script could be interpretable by the web browser application in accordance with the listen-to tag attribute to cause the second component to react to the published data related to the first component.

Further, a provider of such components could swap out the underlying scripts when desired, optimally maintaining support for the developer-declared components and their data-bindings. Thus, in the example described, the request could be a first request and the set of scripts could be a first set of scripts, and the operations could additionally include receiving in response to a second, subsequent request for the same web page, (i) the same declarative markup data defining the hierarchical arrangement of the components of the web page, but (ii) a second set of scripts defining structure and operation of the components of the web page, the second set of scripts being different than the first set of scripts while still supporting the same, unchanged data-binding between the first component and the second component.

A second example embodiment may involve a method incorporating similar operations. For instance, the method could include receiving, into a web browser application executing on a computing device, in response to a request for a web page, (i) declarative markup data defining a hierarchical arrangement of components of the web page, including a first component and a second component, and (ii) a set of scripts defining structure and operation of the components of the web page, including a first script (one or more scripts) defining structure and operation of the first component and a second script (one or more scripts) defining structure and operation of the second component. Further, the method could include establishing, by the web browser application, a DOM of the web page, including populating, by the web browser application, based on the received scripts, shadow DOMs of the components of the web page. And the method could include rendering, by the web browser application, the web page based on the established DOM.

Here again, in line with the discussion above, the declarative markup data and scripts could cooperatively define data-binding between the first component and the second component, with (i) the first script being interpretable by the web browser application to cause the web browser application to dynamically publish data related to the first component, (ii) the declarative markup data including for the second component a listen-to tag attribute that binds logic of the second component with the dynamically published data related to the first component, and (iii) the second script being interpretable by the web browser application in accordance with the listen-to tag attribute to cause the second component to react to the published data related to the first component.

In a third example embodiment, an article of manufacture may include a non-transitory computer-readable medium, having stored thereon program instructions that, upon execution by a computing system, cause the computing system to perform web browser operations in accordance with one or more of the other example embodiments.

In a fourth example embodiment, a system may include various means for carrying out each of the operations of the other example embodiments.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 6 depicts a web page rendered using an example embodiment.

FIG. 7 illustrates a screen shot depicting a portion of an HTML document that represents a page like that shown in FIG. 6.

FIG. 8 depicts page details of a resulting HTML that could be established by a browser rendering the HTML of FIG. 7.

DETAILED DESCRIPTION

Figure 1:
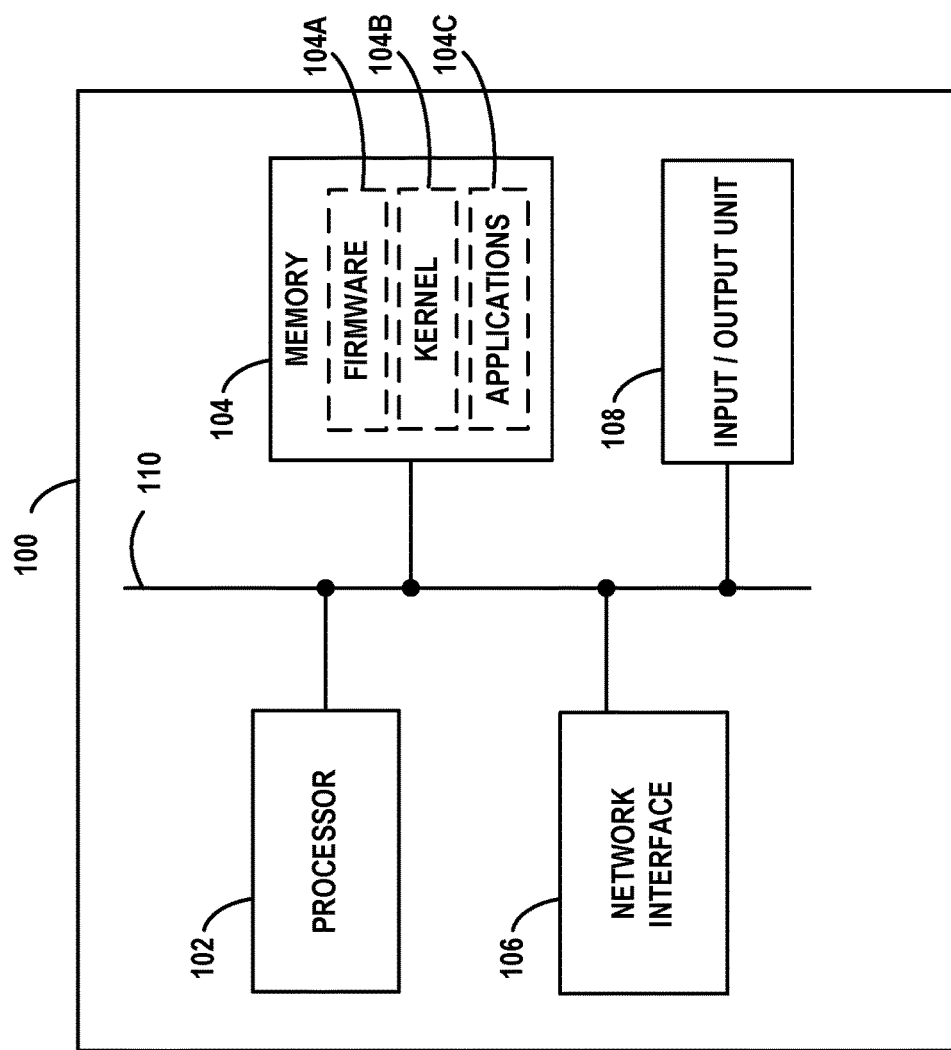
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its business, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
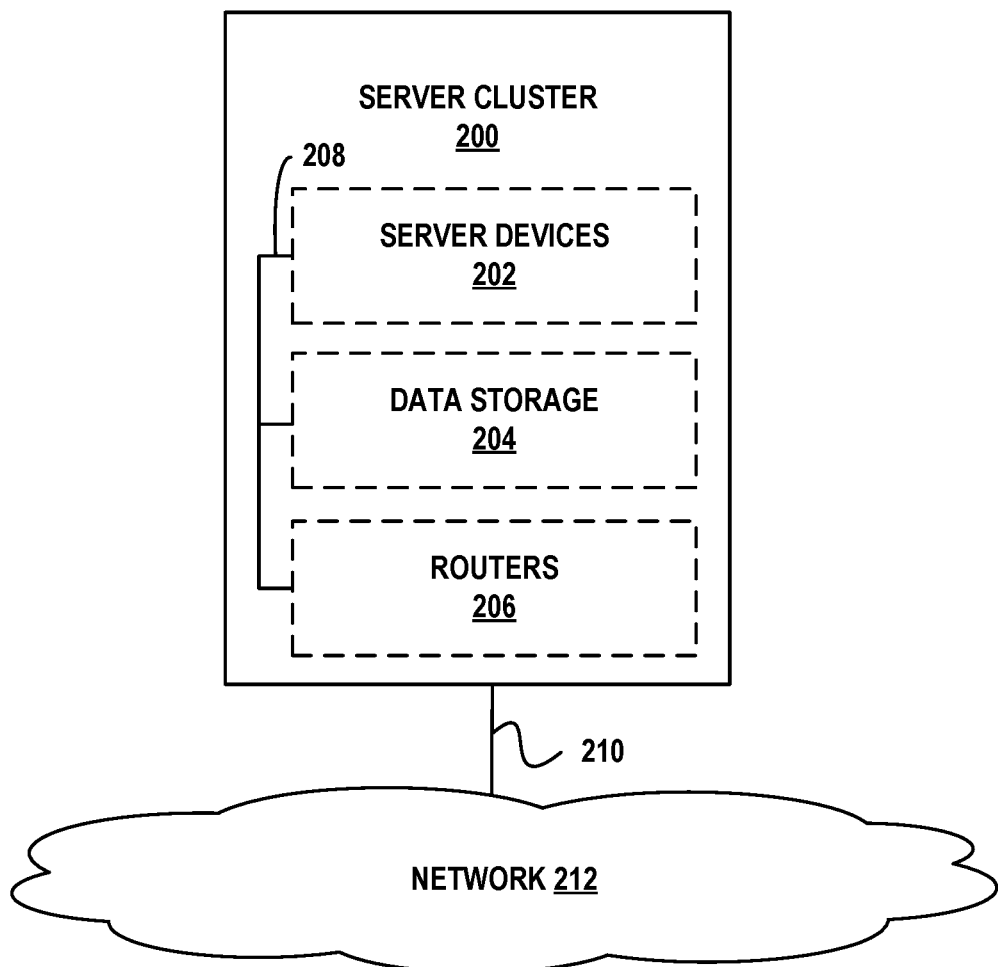
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. Example Remote Network Management Architecture

Figure 3:
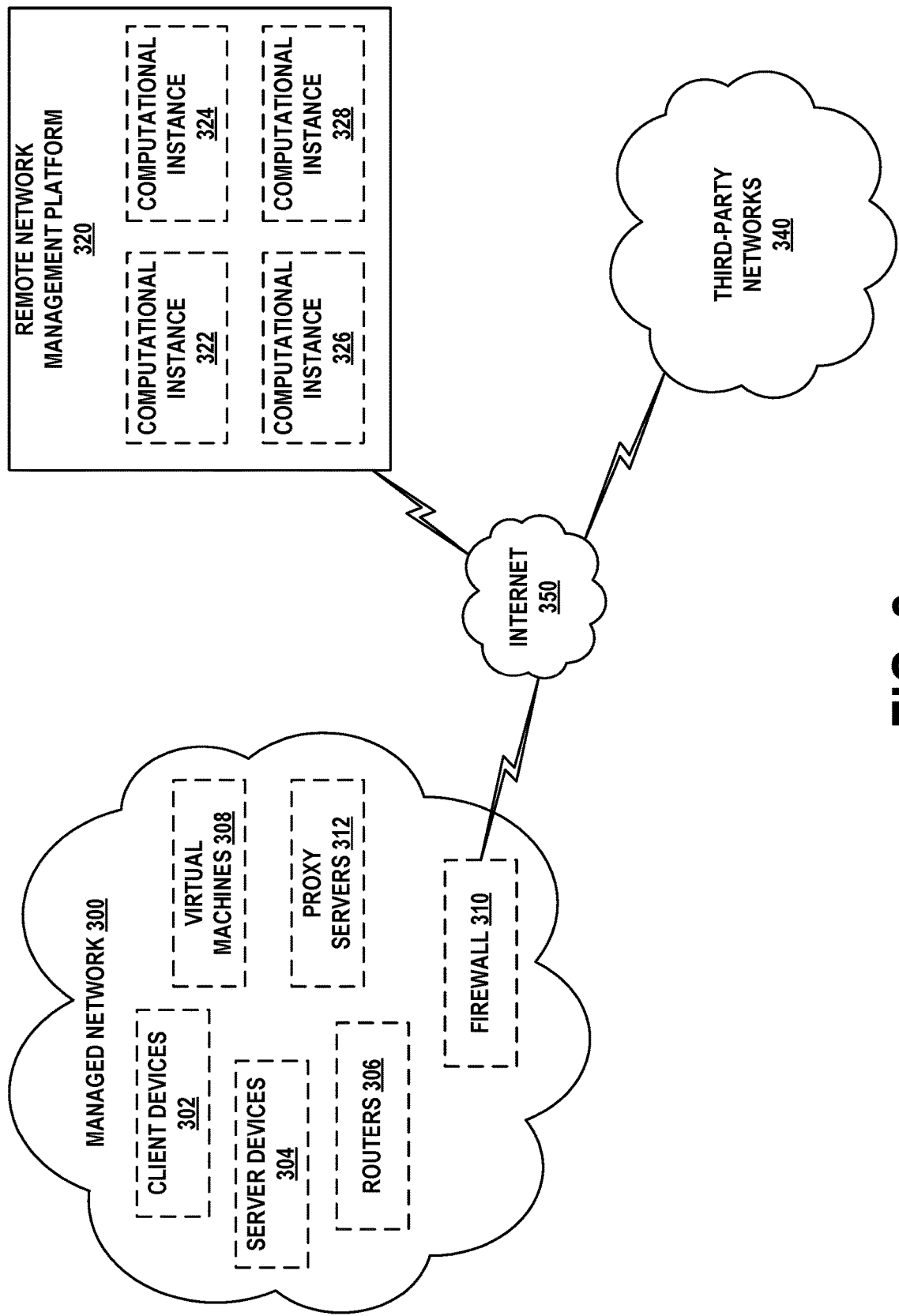
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by a business for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
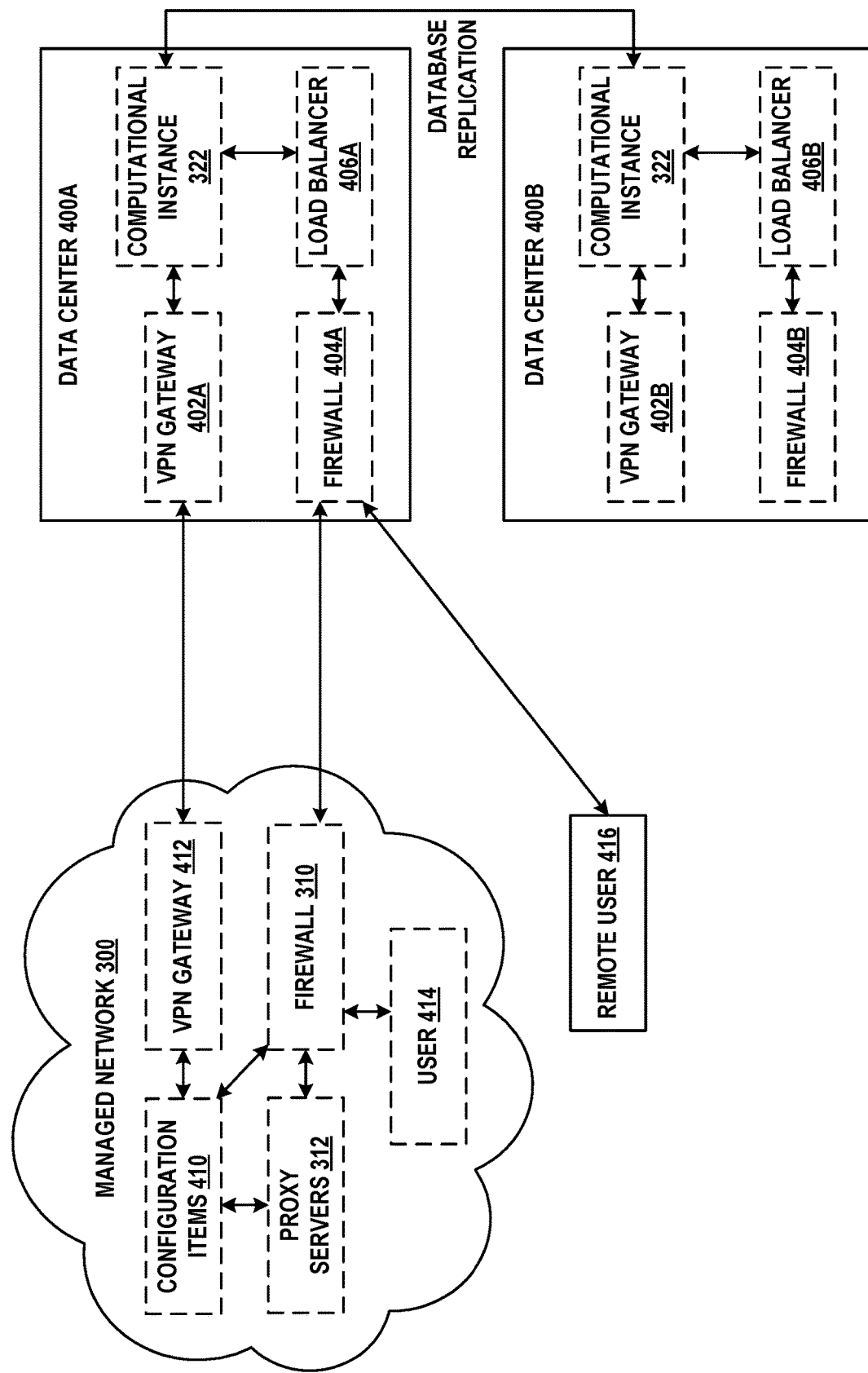
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
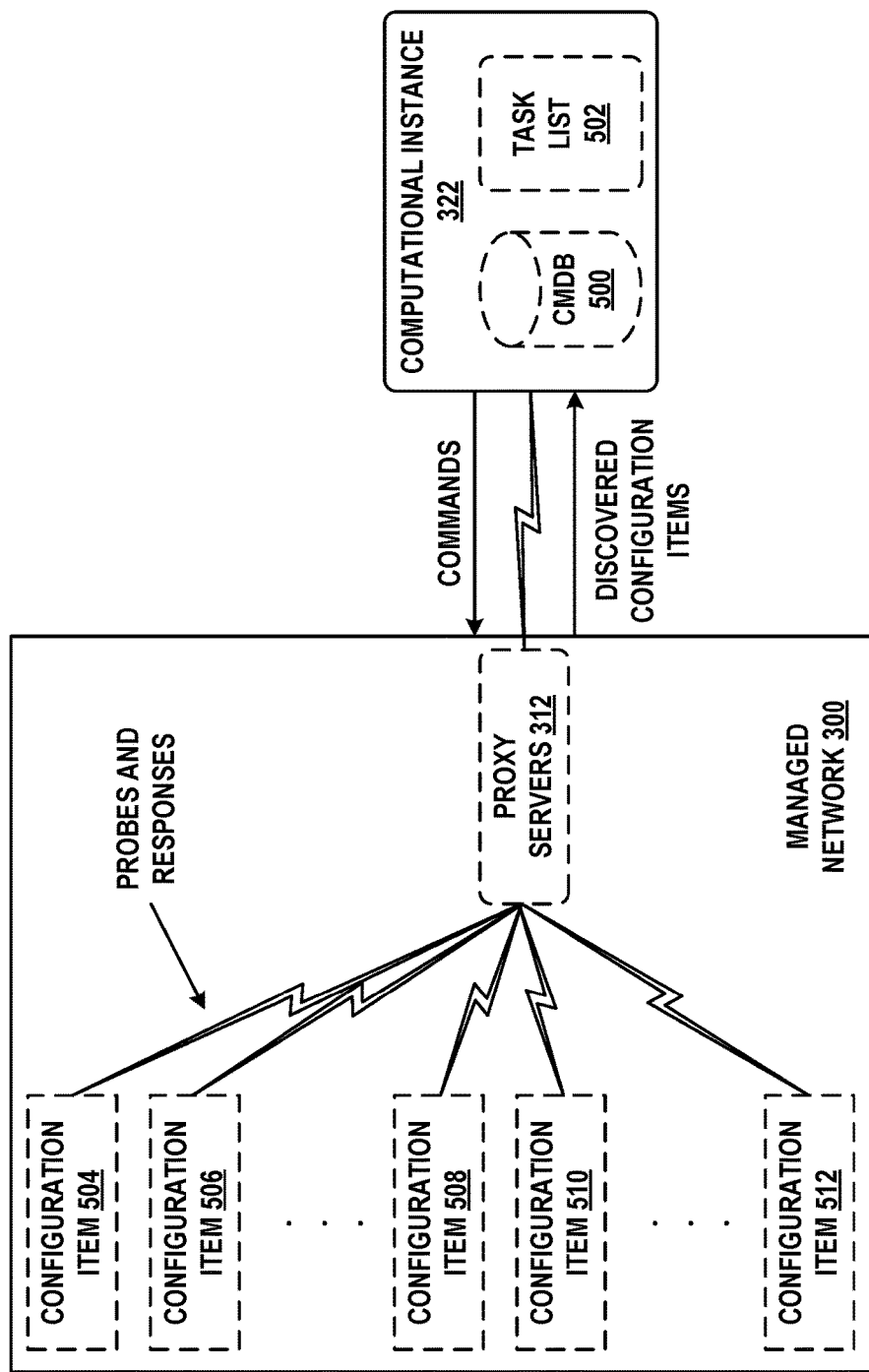
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration.

Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address (es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
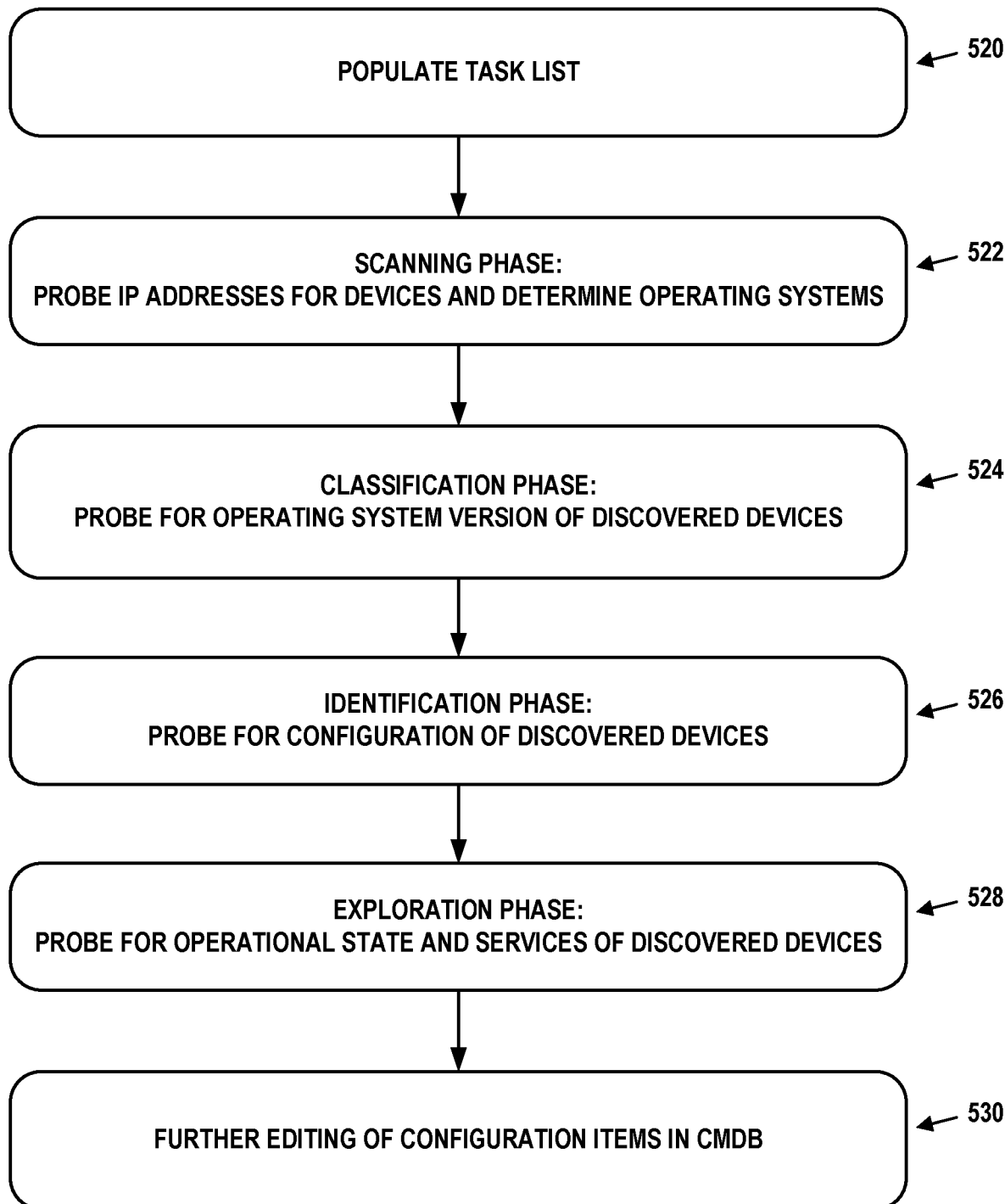
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Modeling, Building, and Rendering Web Pages

A. Overview

As noted above, software applications may be developed by individual departments within an enterprise. Such applications could include or take the form of web applications, including one or more web pages configured to be rendered by web browsers executing on client devices to facilitate dynamic interaction with end users. For instance, an aPaaS system hosted remotely from the enterprise could serve web pages to client browsers. Through interaction with the aPaaS system or other system, a software developer could compose such web pages, defining their structure and operation, and the system could then store the web pages for retrieval and rendering.

As further discussed above, such developers may use frameworks that rely upon underlying logic to drive components of web pages, but those frameworks could become deprecated, resulting in a need to rewrite the web pages.

A representative system as presently disclosed can help to overcome this and other issues, enabling efficient modeling and building of web pages.

The system provides reusable web page components that support inter-component data-bindings to facilitate dynamic web page functionality. Namely, the components are configured to publish actions for reference by other components on a page and to dynamically react to actions published by other components. For instance, a component could be configured to publish action data in response to user action (e.g., clicking on a button or typing in a text input box) or in response to the component's receiving updated properties or the like. Further, a component could be configured to react to such published action data of one or more other components or of other parts of the system or the like, such as by responsively rendering itself in a particular manner, publishing action data itself (for reference by other components), issuing requests for communication with a server, and/or changing its state, among other possibilities).

Each such component has underlying scripting (e.g., JavaScript) that defines the structure and operation of the component and exposes an API for use by a web developer. A developer could thus design a web application by declaratively composing simple markup (e.g., HTML or, where appropriate, XML) that defines a hierarchical arrangement of such components and defines their data-bindings and other desired parameters. Further, a provider of the components could swap out the underlying scripting (e.g., related to the view portions of components) when scripting frameworks change, without necessitating rewrites of web applications that make use of the components, as long as the underlying scripting supports the expected structure and API of the components including associated data-binding features.

Aspects of the system could be provided by a server or server cluster, as in the aPaaS discussed above. Such a system could be configured to support the page components. The system could store the component definitions, including respective underlying script files, and could be configured to deliver those component definitions to a client browser upon request. A web developer could thus compose a markup document that defines a hierarchical arrangement of, and data-bindings between, instances of the custom components and that includes a component loader referencing the component definitions on the server. When a browser renders the markup document, the browser could then retrieve the custom component definitions from the system pursuant to the component loader and could register the components for use. Per the component definitions, the browser could then render the markup, populating shadow DOMs based on the underlying scripts, and accordingly implementing the defined and declared inter-component data-binding.

In an example implementation, the system further includes a page-builder subsystem that enables web pages defined with such components to be represented in a database model on a server, so as to facilitate efficient generation of markup documents that make use of the components. For instance, a database server application executing on a computing device could maintain a relational database (e.g., a SQL database as discussed above) with a schema through which a set of database records cooperatively describe a web page, including page layout, component hierarchy and data-bindings, references to component scripts, among possibly other information, and that relate each of various uniform resource locators (URLs) to such page descriptions. Further, a web server application executing on a computing device could be configured such that when it receives from a browser a request for a page at a particular URL, the web server application responsively queries the database to obtain the database records that cooperatively describe the associated page, the web server application generates a markup document in accordance with that page description, and the web server application transmits the generated markup document to the browser for rendering.

In addition, the page-builder subsystem could provide an interface that enables web developers to design such pages. For instance, the interface could provide a web developer with a menu of available custom web components and could enable the web developer to select desired components for inclusion on a page and to designate desired hierarchy and desired data-bindings and other parameters. As the web developer makes such selections and designations, the page-builder subsystem could then correspondingly generate the database records that cooperatively describe the designed page, to facilitate later generating and delivering a markup document representing the page.

B. Example Implementation

The present system enables the structure of a web page to be described declaratively, with aspects of the page being represented and interrelated with metadata, to establish what components should be rendered on the page and how the components should be configured, including how the components will communicate with each other. Such a system could facilitate efficient development of highly dynamic web applications having possibly complex controls that communicate with each other in new and useful ways.

The system enables web developers to design web pages declaratively rather than imperatively, as the system is built on the back of HTML and an API that defines how various web page components communicate with each other. Further, as discussed above, the components defined by the system could be packaged, represented, and stored as metadata in a database, to enable the system to readily determine the structure of a requested page and responsively generate and deliver an associated HTML document for rendering by a client browser.

Moreover, the system could support the use of various underlying frameworks without the need for the web developer to learn and code in those frameworks (and without even knowing what view technologies were used to create each component), as the system provides a higher-level declarative API. The higher-level declarative API could make use of any of a variety of underlying scripts and frameworks to implement its higher-level declarations. This arrangement can thus help to overcome a common problem where a web developer composes a web page using a particular framework (such as ANGULAR or the like) and that framework then becomes deprecated, requiring the developer to rewrite the entire page using a new framework. The present system instead enables a web developer to declaratively compose the web page (possibly using a front-end design interface) without being exposed to the underlying scripting. Consequently, a provider of the system could swap out the underlying scripting if and when desired, such as when technologies change, while continuing to allow reuse of the web components.

Figure 6:
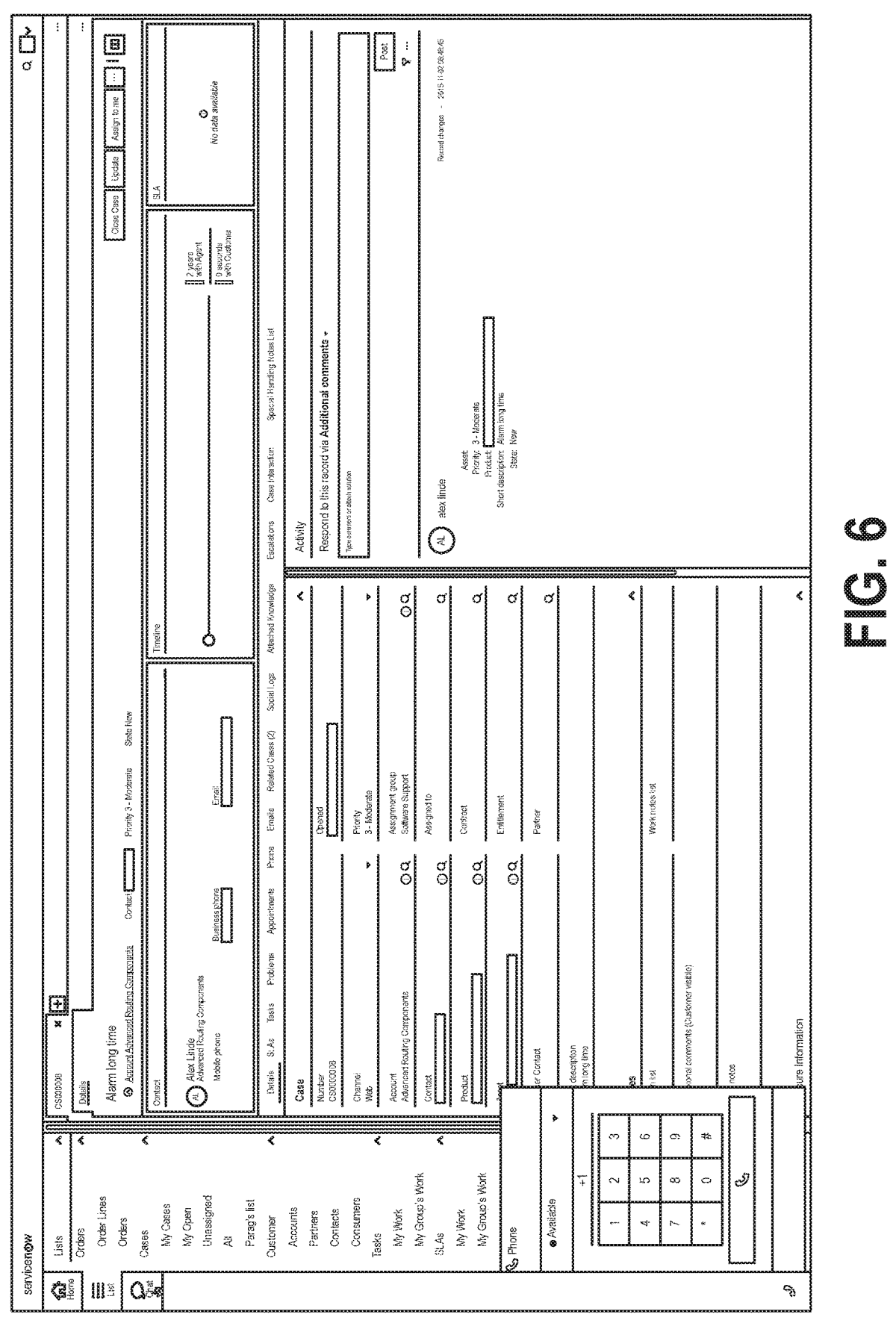

FIG. 6 is an example of a web page rendered using the present system. The web page shown in FIG. 6 is composed of various components. For instance, the page includes a component for its header, a component for lists on the left side, a component for phone call integration, a component for chat, and so forth.

FIG. 7 illustrates a screen shot showing a portion of an HTML document that represents a page like that shown in FIG. 6. Consistent with the discussion above, the markup shown in FIG. 7 defines the page declaratively using relatively simple HTML. The HTML in this example includes a top level "sn-workspace-layout" component and, within that layout component, an "sn-workspace-header" component, an "sn-workspace-toolbar" component, an "sn-workspace-nav" component, an "sn-workspace tabs" component, an "sn-workspace-main" component, and an "sn-component-openframe," some of which then further include other sub-components.

Each of these components has various attributes and properties. For instance, each component has a component-id that uniquely identifies the component. Further, a component could include a "slot" that defines a space in the component's shadow DOM layout that other components could be bound into. And a component could include a "listen-to" attribute that defines a communication mechanism, to listen to actions emitted by one or more other components.

For instance, the example "sn-workspace-header" component includes a "listen-to" attribute that is set to listen to a "GLOBAL_SEARCH_ACTION" emitted by the "sn-component-global-search-typehead" component (referenced by its globally unique identifier (GUID)). Accordingly, the header component of the example page will listen to actions emitted by the global-search-typehead component of the page. Thus, when something happens in the global-search-typehead component, the global-search-typehead component would emit a GLOBAL_SEARCH_ACTION that might indicate or correspond with its state or other associated data, and that action would be bound to the "searchAction" property of the header component, allowing the header component to set its searchAction property value and/or take one or more actions in response.

As FIG. 7 shows, this HTML is relatively simple from a developer's standpoint. The developer could write the HTML as shown to define the hierarchical relationship between web page components as well as the data-bindings between the components. Alternatively or additionally, the system could provide a design interface through which the developer could select and place such components on the page and could define their hierarchy, data-bindings, and other parameters.

Each such component could be defined in advance, using any of a variety of scripting or coding languages or other frameworks, to establish particular structure and functionality of the component, so that the component can be translated to the desired HTML for rendering by a browser. When a browser renders such a page, the browser could thus render each such component by calling a pluggable renderer for the framework that was used to define the component (possibly to populate one or more shadow-DOMs), to obtain associated HTML elements for the browser to render.

To facilitate this, the web page could leverage the web components standard, with the web components including custom elements, shadow-DOMs, and perhaps HTML templates.

Thus, with the example of FIG. 7, the web page could define custom elements as a declarations to the browser for the various custom markup shown on that page. For instance, for the component name "sn-workspace-layout," the page could include a custom element declaration that directs the browser to attach a specified script (e.g., a JavaScript script), with that script then telling the browser how to render the "sn-workspace-layout" component. And the page could likewise include custom-element declarations for the other custom markup as well.

Each such specified script could define aspects of the custom element such as its name, configuration, and behaviors. For instance, the script could specify an associated tag name and an associated JavaScript class that implements an associated API. Further, the script could specify what underlying framework will be used to render the component, what data sources would be used by the component, and what attributes and actions are being defined for the component. While some or much of this underlying component logic will then be hidden from the end-user web developer, certain aspects such as its API (including its available actions) could be exposed to the user, to facilitate use of the component in web development.

The page markup could include a component loader that loads the custom element definitions at the time the page gets rendered, loading necessary web component polyfills, if any, and making sure that core, common, individual component and application bundles are loaded in a correct order. This component loader, for instance, could be a JavaScript call to retrieve from server data storage a predefined bundle of custom element definitions corresponding with various available components. In a representative implementation, these custom element definitions could be built as Node Package Manager (NPM) modules and then packaged together in bundles (e.g., in small distributable bundles, then combined together into larger bundles) for retrieval by browsers at render time.

Each such custom element, which could be registered with a custom-element registry in the browser, could direct the browser to render the contents of a respective component in a shadow-DOM, so as to provide an encapsulation boundary that helps to prevent styling and behavior from being exposed. (This can help prevent a developer from creating a component that impacts another component in an undesired manner, and to help prevent a third-party component developer from developing a component that could break a page.)

Further, such components could be reusable by web developers in building web pages without the need for the web developers to be exposed to the underlying scripting of the components. A web developer could readily declare the hierarchy, data-bindings, and other parameters of the various components as desired, and as in the example shown in FIG. 7, those declarations need not refer to the underlying scripting that would be used to facilitate rendering of the components.

Figure 8:
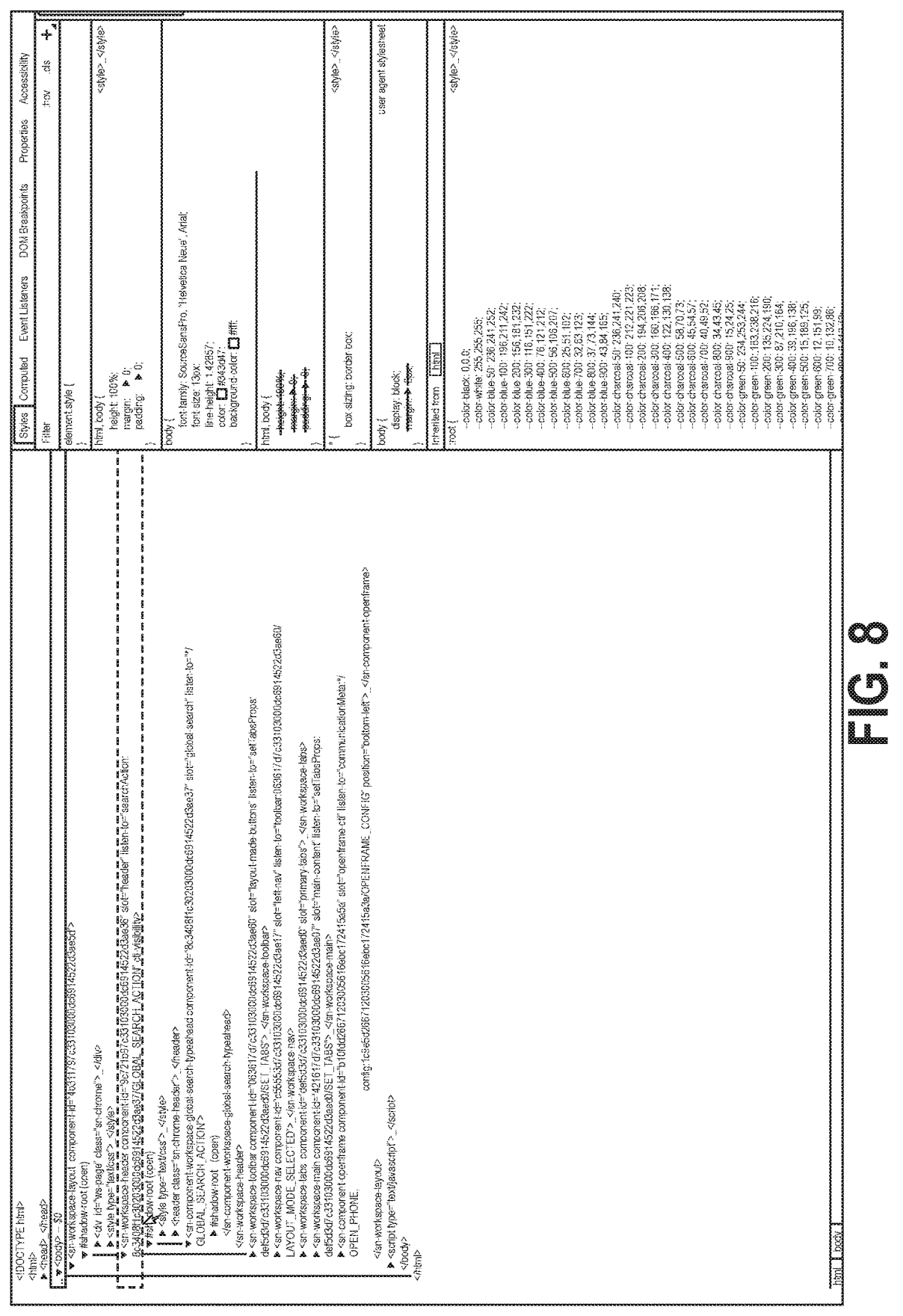

FIG. 8 next depicts page details of the resulting HTML that could be established by the browser processing the HTML of FIG. 7. As shown in FIG. 8, the actual structure and operation of various page components are set forth in shadow-DOMs. The rendering of the shadow-DOMs is then controlled by whatever renderer the system would call to render that shadow-DOM.

With this arrangement, the underlying renderer (e.g., the underlying script and framework used for rendering the script) could be swapped out by a provider of the system if and when desired. The listen-to functionality that establishes the data binding between the components could define API points that could be exposed to authors of the underlying component scripting. This way, components on a page could interact with each other even if their respective underlying scripting technologies are different or are changed, as long as their underlying scripting supports the API points (e.g., specified input and output data types) that are exposed to the web developer to facilitate interaction between components and the like. This can thus avoid the need for the underlying component frameworks to bind themselves to the DOM hierarchy of the page. Rather, the frameworks can more generally be bound to actions as desired.

As noted above, the present system could provide a library of such components available for use by web developers to develop web pages and could provide web developers with a menu of the available components. Through use of a page-builder interface as discussed above, or through more rote HTML programming, web developers could thus select desired components and could compose a web page that specifies hierarchical relationship, desired data-bindings, and one or more other characteristics of the components, in line with the component definitions. The page components at issue in this process could be web components compliant with the web component standard or could take other forms.

In a representative implementation, for instance, the system could include a page-builder subsystem as described above, for use by a web developer in designing a web page. The page-builder subsystem could provide an interface that presents a web developer with a menu of established web components and enables the web developer to select components to include on a web page, to define the hierarchical relationship between the selected components, and to establish data-bindings between the components. The page-builder subsystem could then store the associated page description as metadata in database tables as noted above, to allow efficient generation of an associated HTML document when the page is requested. Alternatively, a web developer might more directly write the HTML without the use of such a page-builder system.

Figure 9:
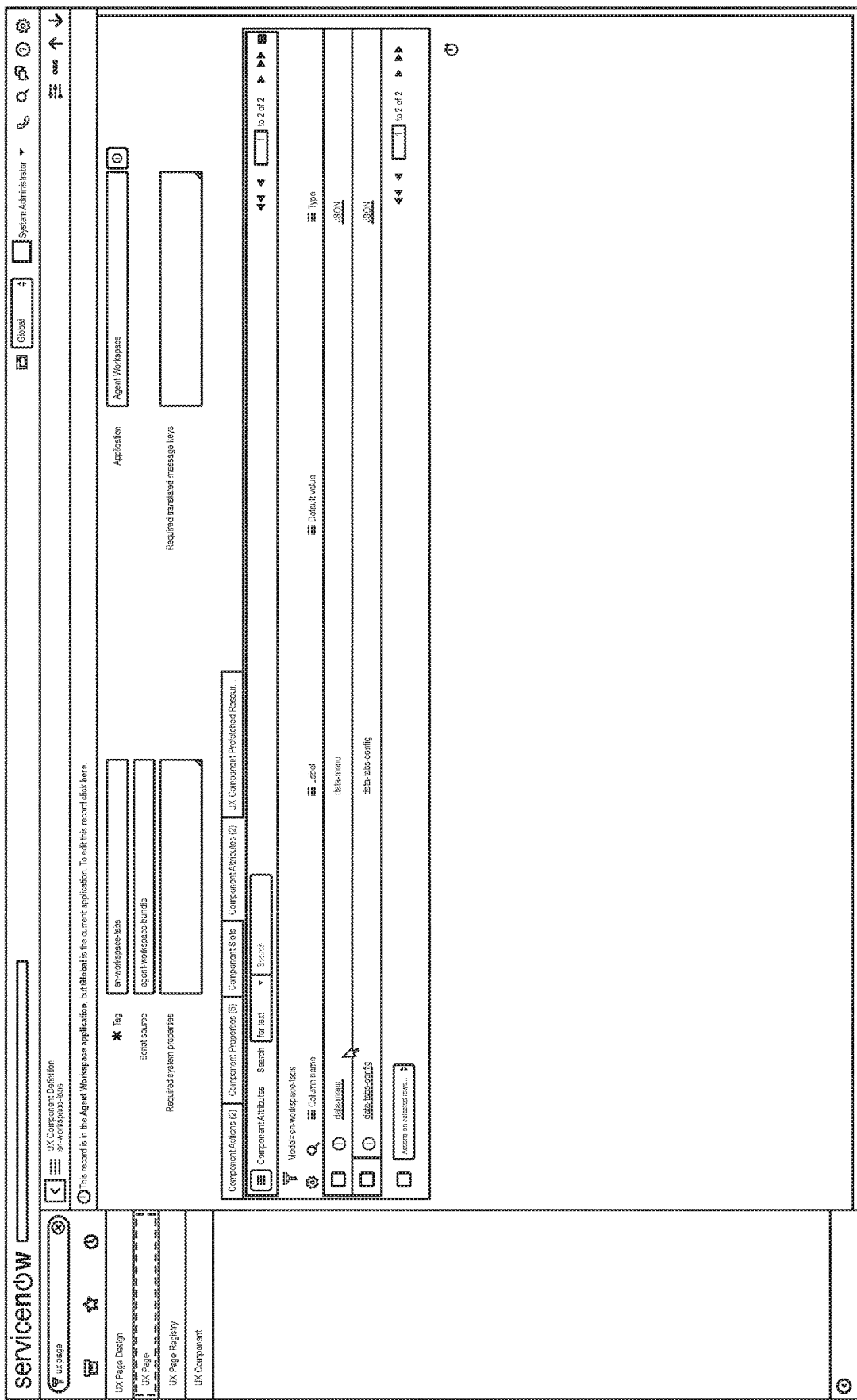
FIG. 9 depicts an attributes portion of a page-builder interface in an example embodiment.
Figure 10:
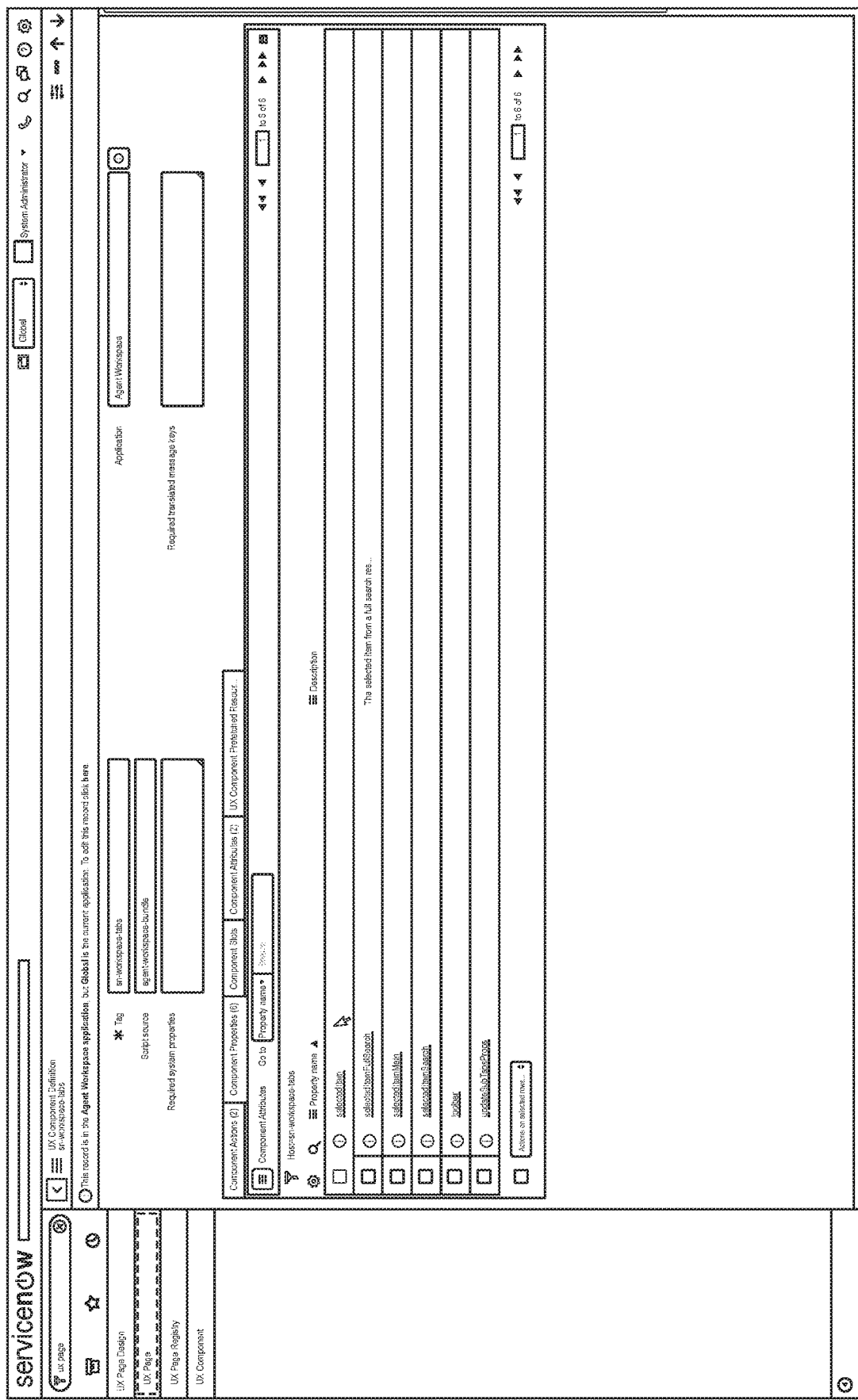
FIG. 10 depicts a properties portion of a page-builder interface in an example embodiment.
Figure 11:
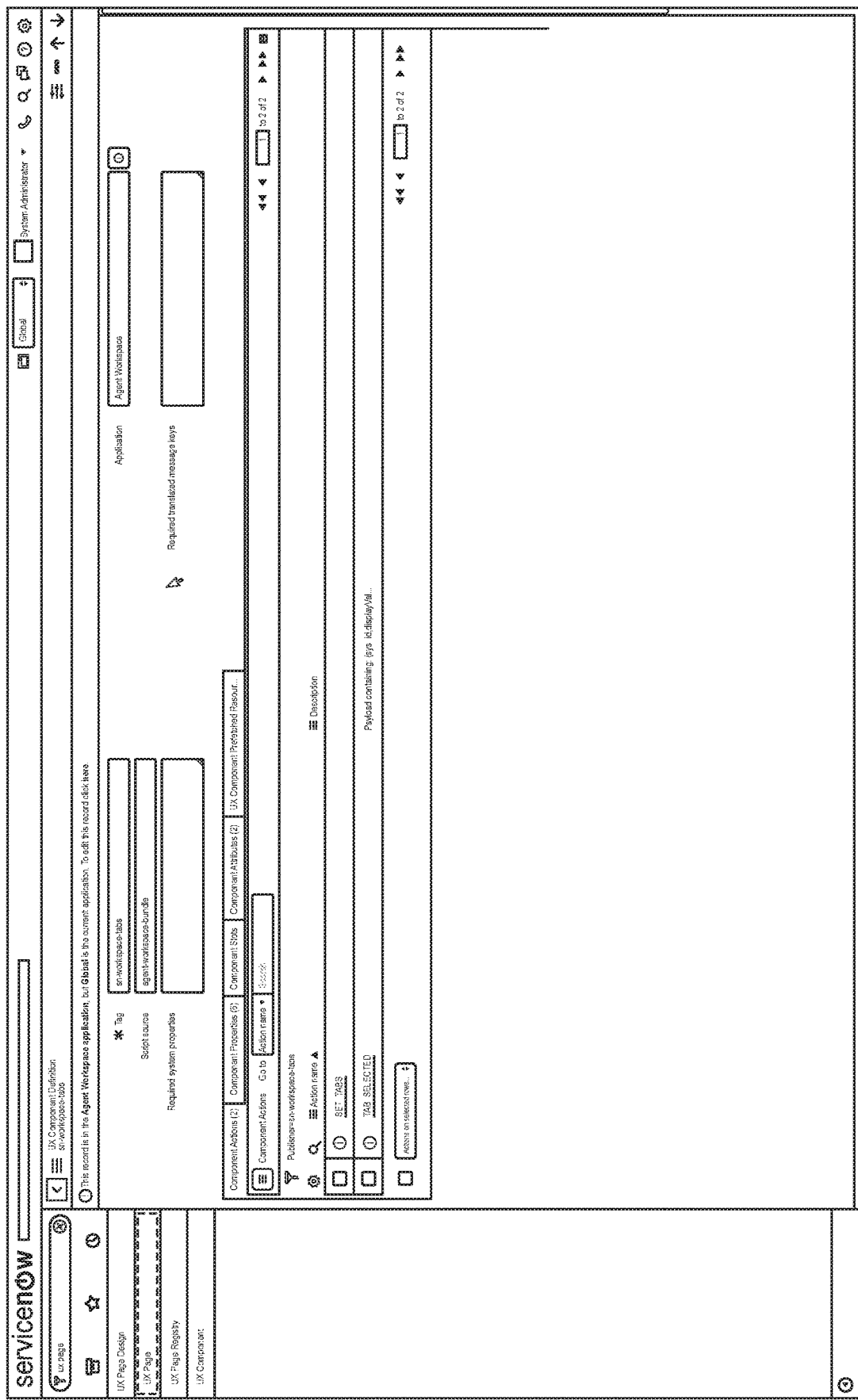
FIG. 11 depicts an actions portion of a page-builder interface in an example embodiment.

FIGS. 9-11 illustrate an example portion of such a page-builder interface that a web developer might use to set parameters of a representative web component, here an example "Tabs" component. Alternative design interfaces, including "what you see is what you get" (WYSIWYG) interfaces, could be provided instead or in addition.

As shown in FIG. 9, the page-builder interface specifies attributes (accessible from the Components Attributes tab) of a data-menu and data-tabs-config, which take payload (e.g., using JavaScript Object Notation (JSON)) that describes how the menu and the tabs should be rendered. Further, as shown in FIG. 10, the interface specifies properties (accessible from the Component Properties tab) that the web developer could set statically or could configure to be dynamically set using the listen-to functionality defined for the component.

Further, as shown in FIG. 11, the interface specifies various actions (accessible from the Component Actions tab) that define information that the component would publish or emit for receipt by other components that are set to listen to those actions. For instance, the example shows a TAB_SE-LECTED action, which could be an action that would be invoked when a user clicks on a tab, causing the component to publish the TAB_SELECTED action (effectively indicating or corresponding with the invoked-state of the tab). In practice, another component on the web page could then be set to listen to that action of the Tabs component and to respond to the action by setting associated property values, taking associated actions, or the like.

Through use of such a page-builder interface or the like, a web developer could develop a web page by selecting web components to include on a page (e.g., from a menu of available components), designating hierarchical arrangement of the components (e.g., by rote placement or other designation of parent-child relationships of components), establishing data-bindings between the components (e.g., by declaring the listen-to properties of components), and setting one or more other parameters of the components. The page-builder interface could essentially expose to the web developer the available API points of each such component, to enable the web developer to set such parameters.

By way of example, as the web developer designs a web page, the web developer might select the Tabs component discussed above, declare particular hierarchy and placement of the Tabs component on the page, declare any static attribute values, and declare any listen-to properties that could be dynamically set at run time based on actions of one or more other components on the page. (For instance, through the page-builder interface, the developer could define selectedItem, data-menu, and other aspects of an instance of the Tabs component.)

In line with the discussion above, the page-builder subsystem (e.g., through stored component definitions) could associate each component with its underlying script, such as with a particular JavaScript file, that defines details of the component. When the page-builder subsystem outputs the resulting HTML document for delivery to the browser, the page-builder subsystem could also deliver to the browser the custom-element definition for the component, including or additionally delivering to the browser a JavaScript file that defines how to render that component. With this arrangement, the web developer need merely declare an instance of the component on the page, and the system can responsively enable rendering of the component by providing custom-element script and associated markup to facilitate use of the custom element and thus use of the component.

As further discussed above, the system could be configured to store descriptions of web-component-based pages as tables in a relational database, so that the system could readily respond to page requests. For instance, the page-builder subsystem could provide an interface through which a web developer could design such a page, and as the web developer designs the page (e.g., selecting and placing components and defining their hierarchy, data-bindings, and so forth), the page-builder subsystem could generate and store database records that cooperatively describe the page.

Figure 12:
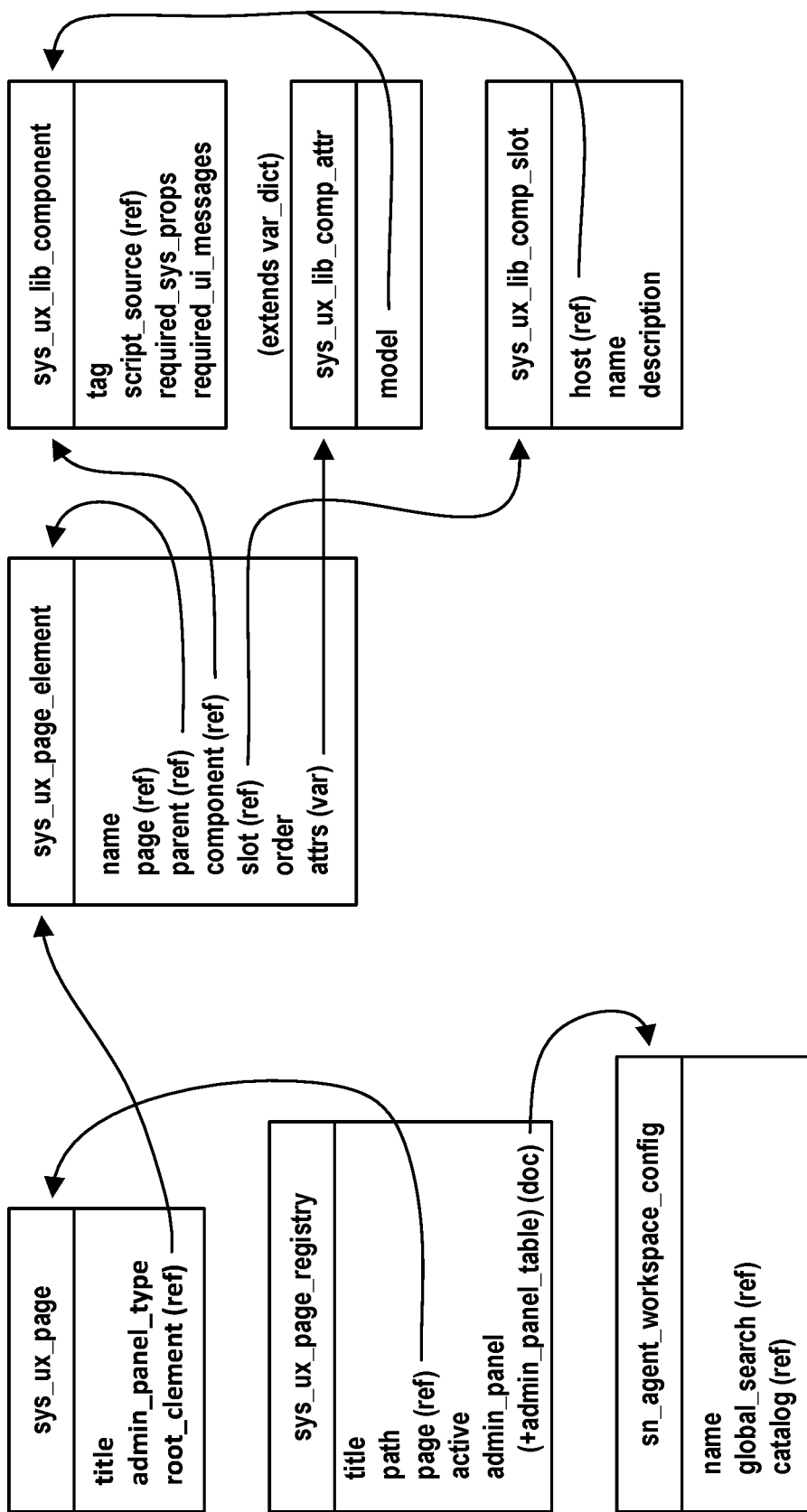
FIG. 12 depicts a portion of a database schema for use in example embodiments.
Figure 13:
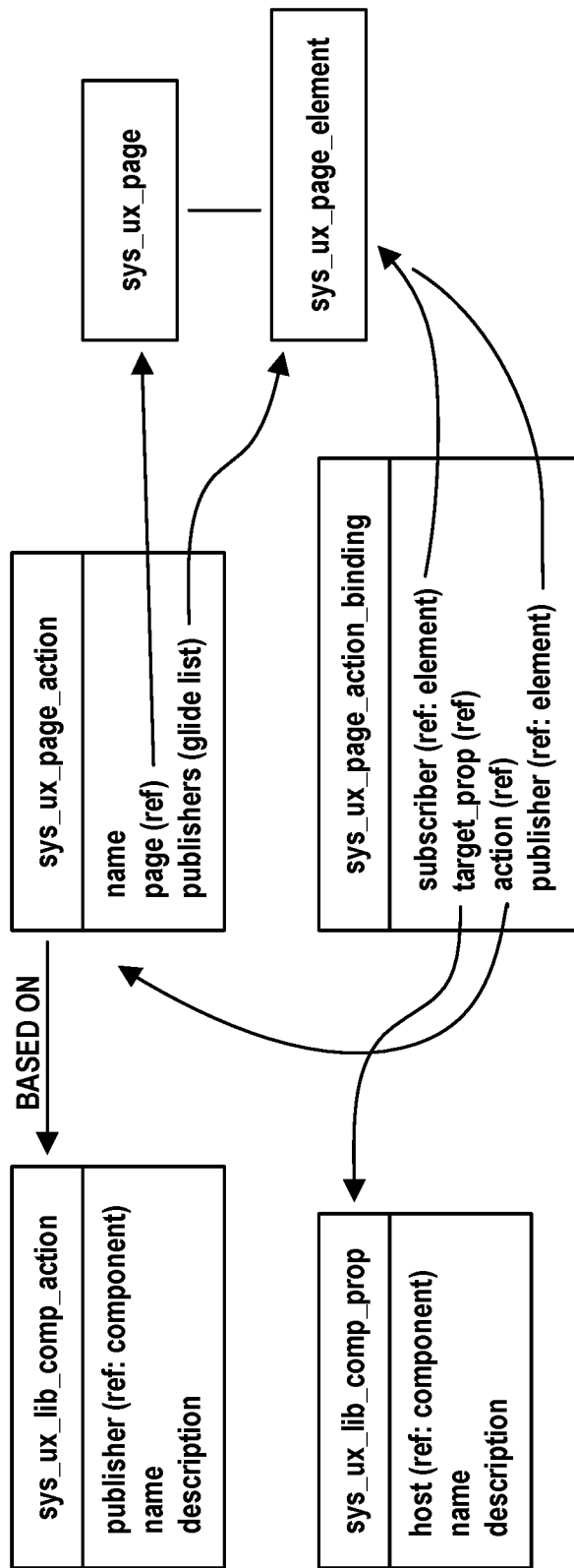
FIG. 13 depicts another portion of a database schema for use in example embodiments.

FIGS. 12 and 13 depict an example database schema, showing how the page-builder subsystem could represent web pages with a group of interrelated database tables, defining a plurality of interrelated records. In the illustrated schema, tables related to defining specific pages are labeled with the prefix "sys_ux_page", and tables related to the library of page building blocks are labeled with the prefix "sys_ux_lib".

Shown on the left side of FIG. 12 are tables involved in describing an example of page registration, to establish a root element of the page and to associate one or more URLs or the like with bespoke configurations of the page. And shown on the right side of FIG. 12 are tables involved in describing page structure, through a plurality of interrelated records cooperatively defining a hierarchical arrangement of components of the page, including references to underlying scripts interpretable to define structure and operation of the components.

In the example arrangement shown, "sys_ux_page" acts as a container record, pointing to a root element in a page structure. "Sys_ux_page_registry then associates a page record (the structure) with a URL path/site name and a bespoke configuration record. FIG. 12 illustrates this by way of example as a document field corresponding with an example "admin_panel" database record. But the page could just as well be registered to be associated with other URLs or paths.

More generally, the system could register URLs or other paths to each be database-associated with respective sys_ux_page_record, so as to establish an associated web page configuration for the URL, and each URL registration record can have a settings record associated with it, conforming to a bespoke schema specified by the sys_ux_page record, unique to that sys_ux_page record. This enables multiple URLs to make use of a given web page structure/configuration, with the pages differing from each other in terms of their underlying respective configuration data relevant to their URL.

Each root element web page (of a sys_ux_page table) then has a database relationship with a hierarchy of page elements (sys_ux_page_element records). Each page element points to its parent element via a reference field, thereby representing the structural hierarchy, so that a database query can readily find each element that is a child of a given element, thus enabling efficient searching to establish a full tree representation of the page. Thus, the relational database records cooperatively describe a DOM tree representation of the page.

Further, each page element is an instance of a component node, which specifies the underlying source file, tag name, slots, attributes, and actions (events) that enable communication with other nodes in the hierarchy. For instance, each component could specify one or more slots where a child component could be associated in a shadow-DOM. And each component could specify one or more attributes and one or more properties.

More particularly, in the example shown, each page element record includes a reference to a component definition record ("sys_ux_lib_component"), and the component definition record in turn includes a reference to its underlying script source file as well as fields for defining properties and other aspects of the component. Each page element record could include various attributes, by reference to one or more attribute records. Further, as a component could use a shadow-DOM to manifest its internal structure, the component definition could specify a set of slots to help indicate where child elements should be rendered in the shadow-DOM. When a page element is created and put into a page structure, the system could record in the page element a reference to a slot of its parent component's definition that it should be bound to, as a slot field referencing a slot definition record ("sys_ux_lib_comp_slot").

FIG. 13 next depicts how the page-builder subsystem could represent with a plurality of interrelated database records various component-to-component data binding by way of example. As discussed above, the underlying definition of each component could specify actions that it publishes. These actions could be data containers that would be passed around by the front-end framework to facilitate inter-component communication. In FIG. 13, these actions are defined by "sys_ux_lib_component_action" records.

When a component instance is placed on a page (as a "sys_ux_page_element" record), the page-builder subsystem could add the component's actions (per the component definition) to a catalog of page actions by recording the actions in "sys_ux_page_action" records—as actions available for other components to listen to. Further, each component on the page could have component properties or various operational features that the page-builder subsystem could represent in sys_ux_lib_comp_prop records. When a web developer specifies a binding between a subscriber component and a published action, the page-builder subsystem could then record that binding in a "sys_ux_page_action_binding" record that specifies the action (by reference to the sys_ux_page_action table), the subscriber element (by reference to the sys_ux_page_element table), the publishing element (by reference to the sys_ux_page_element table), and the target property of the subscriber element (by reference to the sys_ux_lib_comp_prop table).

With this example database schema, a page-builder interface could receive web-developer input selecting a component to put on a page and could provide the web developer with a menu of the actions that the component emits. Further, the interface might receive web-developer input specifying which such actions should be made available to the page space, for other components on the page to subscribe to. And the interface could receive web-developer input that adds another component to the page and establishes an action data-binding between it and the publisher component. The page-builder subsystem could then responsively store this inter-component data-binding in tables as noted above, specifying the action being subscribed to, the subscriber component, and the publisher/emitter component (or perhaps a wildcard, if it will be possible for multiple components on the page to publish the indicated action).

In line with the discussion above, this database schema can facilitate efficient rendering of web pages, allowing reuse of web components and establishing dynamic data-bindings between the components.

When the system receives from a browser a request for a web page designated by a URL or site name, the system could query various host provider extensions and thereby determine that the request belongs to the page-builder subsystem (e.g., by finding that the URL is registered to a particular sys_ux_page), and the system could therefore route the request to the page-builder subsystem for handling. A host provider for the page-builder subsystem could then construct a UX (user experience) page request and pass the request to a UX page-processor class, which could then build the markup and send the markup to the requesting client/browser for rendering.

Namely, upon receipt of the UX page request, a server implementing the UX page processor could readily perform database queries to build a tree representation of the page as discussed above and could then translate that tree representation into HTML markup. Further, the server could include that markup in an HTML document along with other applicable content, including a component loader to facilitate rendering of the custom components. And the server could bundle the reference script files for use by the browser in rendering the page. The server could then deliver a response to the browser, providing the browser with the HTML document, possibly along with the underlying script files, for rendering.

Figure 14:
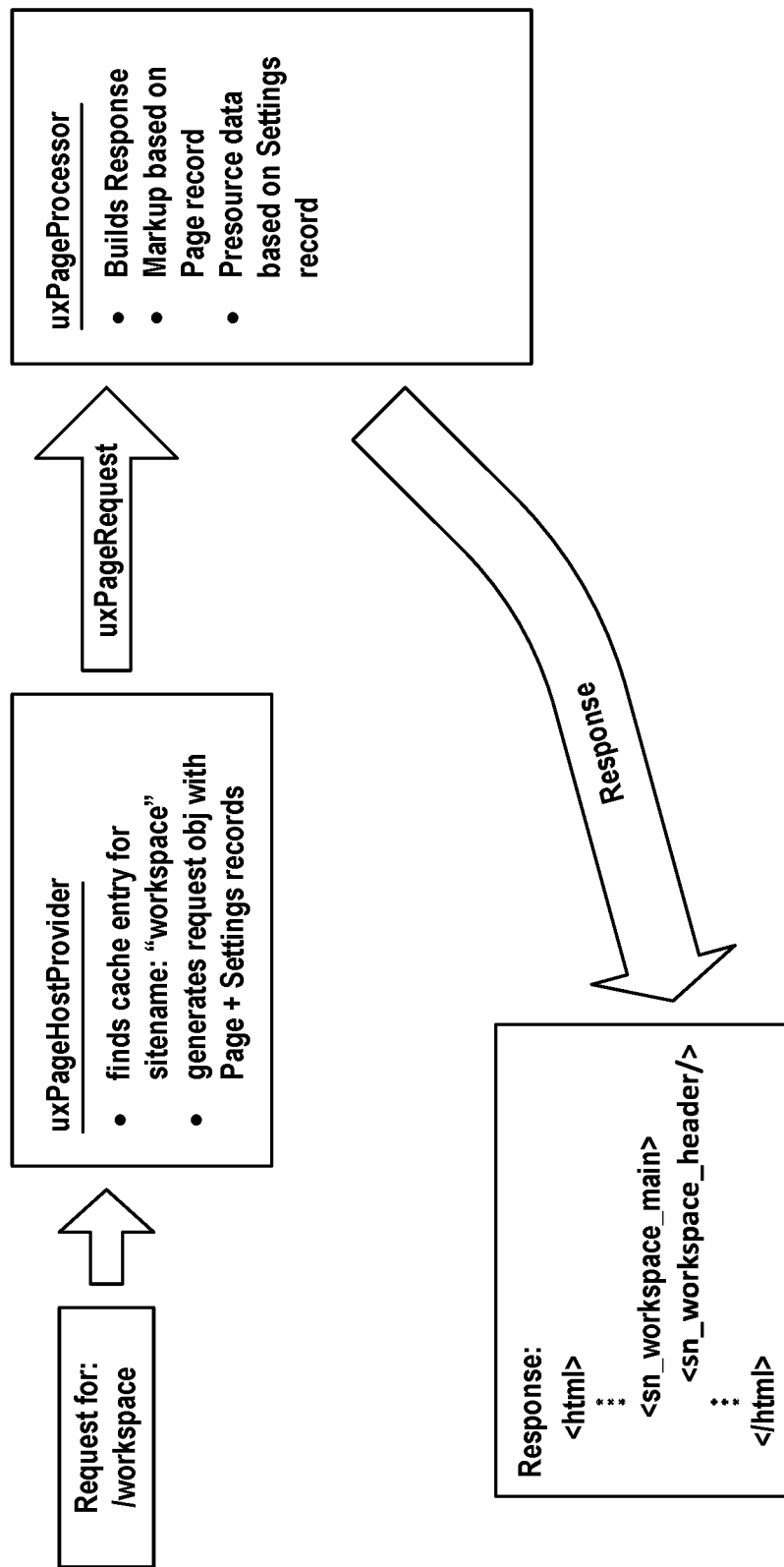
FIG. 14 depicts an example process flow for constructing and delivering an HTML document in response to a page request.

FIG. 14 depicts this process flow by way of example, for a page of an example "Workspace" site. In the arrangement shown, various classes can be Java classes, by way of example. A UXPageHostProvider class is responsible for determining if a request for a given site name should be served by the page-builder subsystem, and for maintaining a cache of entries that associate a site name with a page record (structure) and an optional settings record. As shown, upon determining that the request is for a page of the "Workspace" site, the UXPageHostProvider generates a UxPageRequest to be fulfilled by a UXPageProcessor class. In response to this request, the UxPageProcessor class could then make use of various other classes to generate the associated HTML document for delivery in a response to the requesting client. Further, the UXPageProcessor could be responsible for determining which JavaScript source files are required to drive the components on the page, and to bundle the source code if appropriate and provide associated resource tags in the HTML document.

In an example implementation, a server executing the UxPageProcessor class could query the database to ascertain the component tree-structure representing the hierarchical arrangement of components of the page and to ascertain the data-bindings between the components of the page. For instance, starting with the root element of the page, the server could iteratively or recursively query the database based on parent fields to determine the component hierarchy of the page and could store the query results in Java data objects cooperatively defining a component tree-structure of the page. Further, the server could query the database to determine any data-bindings defined between components of the page and could store specifications of those data-bindings, possibly in the Java data objects defining the component tree-structure.

Having thus ascertained the component tree-structure and data-bindings for the page, the server could then construct a markup document that represents the ascertained component tree-structure and data-bindings and includes a component loader operative to load the underlying scripts. For instance, the server could construct a markup document like that shown in FIG. 7 as discussed above, including hierarchical declarations of the page components along with characteristics such as slots and listen-to properties. And based on the database indications of the underlying scripts respectively per component of the page, the server could include in the markup document a component loader declaration operative to load those scripts (e.g., interpretable by a computing device to load the scripts). The server could then output this constructed markup document for rendering by the requesting web browser. For instance, the server could transmit the markup document to the browser.

In practice, if the representative system serves many clients (e.g., in an aPaaS architecture), the system may engage in extensive real-time querying of the database in response to client requests for web pages. To help manage the resulting network and processing burden, the system could also be configured to cache certain results of these queries, to facilitate efficiently responding to later requests for the same pages. For instance, once the system ascertains the component tree-structure and data-bindings of a page, the system could cache in data storage the Java data objects representing the tree structure and data bindings, perhaps for a defined cache period. That way, when the system later receives a request for the same page, the system could readily retrieve from data storage the previously ascertained tree structure and data bindings and could readily construct the associated markup document for output and rendering by the requesting client.

In any event, upon receipt of the markup document, the browser could then execute the component loader to retrieve from server data storage the underlying scripts defining the structure and operation of the components. The browser could thus build a full DOM for the page and could render the page based on that DOM.

More particularly, the browser may output for transmission to a server a Hypertext Transfer Protocol (HTTP) request for the web page. And in response, the browser may then receive from the server an HTTP response carrying a markup document such as HTML document that includes declarative markup data similar to that shown in FIG. 7.

The server may generate such a markup document dynamically from a database representation of the page as discussed above and deliver the markup document in response to the browser, and/or the server may have the markup document, or a portion thereof, stored statically and could deliver that markup document to the browser. Further, the browser could receive the set of scripts in various ways.

In an example implementation, the server could include in the markup document a component loader comprising one or more references to the scripts that define structure and operation of the declared components. Upon receipt of the markup document, the browser could thus request and receive the indicated scripts. The component loader could include a coded reference (e.g., coded URL or other reference) to a bundle of scripts associated with the components declared in the markup document, and the browser could use that reference to request and receive that bundle of scripts. Alternatively or additionally, the component loader could include multiple references, and the browser may use those references to request and receive the scripts. Thus, in response to the browser's request for the web page, the browser could indirectly receive the set of scripts defining structure and operation of the components of the web page.

Alternatively, the server could transmit together with the markup document the underlying scripts for the components of the web page. Thus, in response to the browser's request for the web page, the browser could directly receive both the declarative markup data defining the hierarchical arrangement of components of the web page and the set of scripts defining the structure and operation of those declared components.

In line with the discussion above, the declarative markup data and scripts that the web browser receives in response to its request for the web page could further cooperatively define data-bindings between components of the web page. For instance, the received script (one or more scripts) that underlies a first such component of the web page could be interpretable by the browser to cause the browser to dynamically publish data related to the first component (such as the invoked-state of the tab component discussed above). Further, the declarative markup data could include for a second such component of the web page a listen-to tag attribute that binds the second component with the dynamically published data related to the first component. And the received script that underlies the second component of the web page could be interpretable by the browser to cause the second component to react to the published action data of the first component.

Upon receipt of this declarative markup data and set of scripts for the requested web page, the browser could then establish a DOM of the web page. For instance, pursuant to the declarative markup data and the underlying component scripts, the browser could populate shadow DOMs of the various components, building more specific markup like that shown in FIG. 8, and could register declared data-bindings and other operational characteristics of the components. The browser could then render the web page in accordance with the established DOM of the page. For instance, according to the DOM, the browser could generate and output for display a GUI.

As further discussed above, the underlying scripts for the components of such a web page could be changed over time while still supporting associated APIs including associated inter-component data binding and the like. For instance, a provider of such components could rewrite the scripts that define the structure and operation of the components, possibly writing the scripts using a different scripting language and/or structured in a different manner. Optimally, the changed underlying scripts would maintain support for exposed APIs, including data binding functionality of the components, so that web applications that were designed to use the components could still function as designed and desired notwithstanding the change in the underlying scripts.

In an implementation that uses a page-builder subsystem as discussed above, database references to scripts for various components can be revised to point to the changed scripts. That way, the server could deliver the changed scripts to a requesting web browser to facilitate rendering of the page. In this or other implementations, the component loader provided in or with the markup document delivered to the browser could include one or more references to the changed scripts, so that when the browser obtains the scripts, the browser would obtain the changed scripts. Alternatively, in this or other implementations, the references to the scripts could remain unchanged but the referenced scripts could be changed, so that when the browser obtains the scripts, the browser would similarly obtain the changed scripts.

In an example implementation, such a change in one or more underlying scripts for web page components could result in a scenario where a web browser retrieves and renders the same web page at two different times, with the scripts being changed between those times.

The first time the browser requests the web page, the browser may receive in response the declarative markup data defining a hierarchical arrangement of components of the web page and a first set of scripts defining structure and operation of the components, with the declarative markup data and scripts cooperatively defining data binding between at least a first component and a second component. The browser may thus use the declarative markup data and scripts as a basis to establish a DOM for the web page and may then render the page per the DOM.

In turn, when the browser subsequently requests the same web page, the browser may receive in response the same declarative markup data defining a hierarchical arrangement of components of the web page but a second set of scripts defining structure and operation of the components, with the second set of scripts being different than the first set of scripts due to a change of one or more of the scripts in the interim. Optimally, though, the second set of scripts would still support the same, unchanged data binding between the first component and the second component, and perhaps other exposed API functionality, so that the web page could still operate in the manner designed and expected.

With this arrangement, because the web developer need not (and indeed may not) have access to the internal code or scripting underlying the web components, a provider of this system could swap out the underlying code or scripting largely transparently, possibly switching to use a latest scripting language or other framework if desired, as long as the underlying logic would still support the high-level component definitions and inter-component communication model APIs of the components. This can allow the system provider to stay current on the latest technologies without having to rewrite web pages and in some cases very complicated web applications, since the provider need merely revise the back-end scripting. Consequently, web developers who use the present system could rely on their web pages being useable in the future even as underlying scripting technologies change. This is in contrast to an arrangement where a web page is itself written using a framework that then becomes deprecated, necessitating a full rewrite of the entire web page.

Further, in contrast to how other web development frameworks may operate, a representative implementation of the present system need not include any application-level controller or bootstrapping. The web developer could merely bring in individual components by putting tags on the page, supplying desired attributes and the like. The web developer need not be concerned with defining how the framework bootstraps or behaves, as the system is ultimately keyed to the individual components, which can be added or removed, and interrelated, as desired.

Still further, while the present system could make good use of the web components standard to define new web components, the system further provides for components on a page to interact with each other in useful ways. Namely, with the listen-to functionality discussed above, it becomes possible for a web developer to have components (e.g., even sibling-components) on a page interact with each other. For instance, two custom-designed components could exchange messages with each other in a structured way without the need for the web developer to write JavaScript code that defines what to do with data output from one component and how it should be incorporated or used by or should otherwise impact another component. The system could thus enable a web developer to develop a dynamic web page without the need to write underlying code.

For example, consider a simple example where the design goal for a page is to put a list on the left side and detail-form on the right side.

Without the present system, a developer might write some JavaScript to provide a list widget and might write some JavaScript to provide a form widget, and the developer might further write some JavaScript code that listens to the action "item-clicked" on the list-widget and, upon seeing that action, might write some content into the form on the right, so that the form control would update to show what a user clicked on in the list. This process thus requires the writing of some JavaScript code and likely a bootstrapping process and so forth.

With the present system, on the other hand, the web developer's process can be entirely declarative, without a need to engage in any imperative scripting. The web developer might simply include declarations of a list component and a form component and provide for the form component a listen-to tag attribute that causes the form component to listen to an item-selected action of the list component. The underlying scripting of the form component could then take care of populating its fields as necessary.

C. Example System for Modeling and Serving Web Pages

Figure 15:
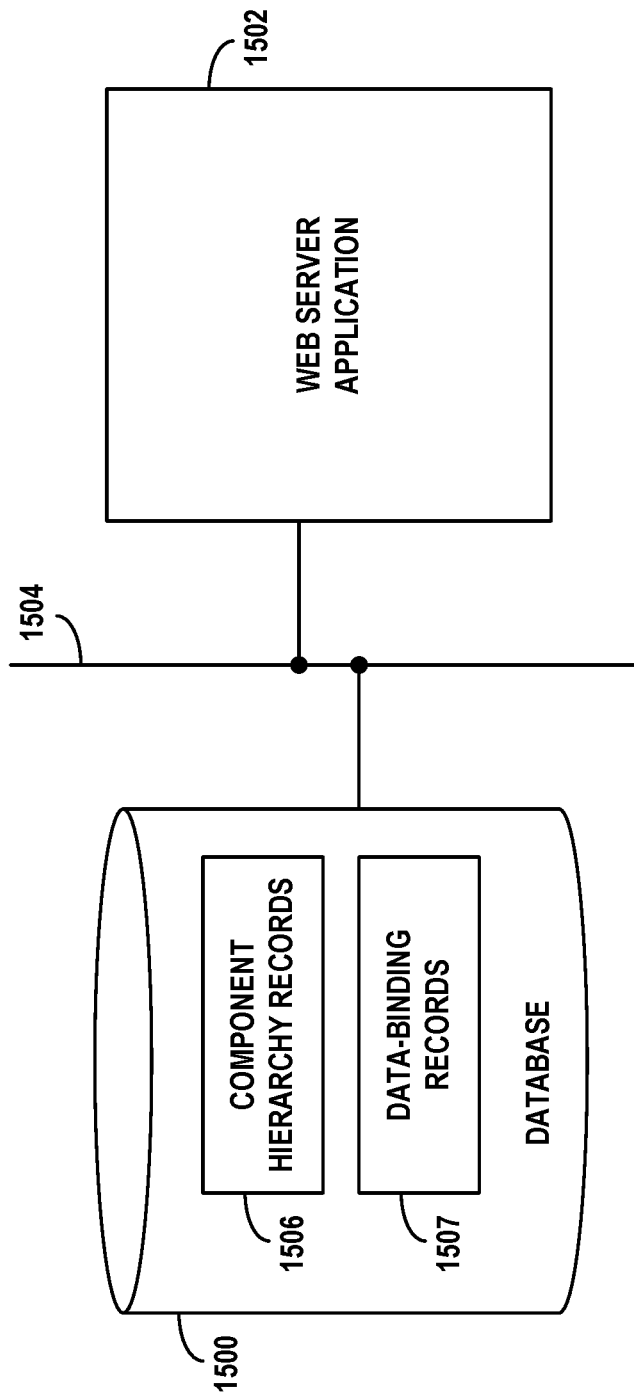
FIG. 15 is a simplified block diagram of a system operable in example embodiments.

FIG. 15 is a simplified block diagram depicting a system operable in accordance with the present disclosure. As noted above, this system could be implemented by a server or server cluster, as in the aPaaS discussed above. As shown in FIG. 15, the system includes a database 1500 and a web server application 1502, which could be integrated or interconnected by a network or other connection mechanism 1504.

The embodiment of FIG. 15 may be simplified by the removal of any one or more of the features shown therein. Further, these embodiments may be combined with features, aspects, and/or implementations of any of the previous figures or otherwise described herein.

As illustrated, the database 1500 contains a plurality of interrelated records 1506 cooperatively defining a hierarchical arrangement of components of a web page, including references to underlying scripts interpretable to define structure and operation of the components of the web page, and a plurality of interrelated records 1507 cooperatively defining data-bindings between the components of the web page.

The web server application 1502 executes on a computing device and is configured to carry out various web server operations (e.g., to cause the computing device to carry out the operations). For instance, the web server application is configured to receive, from a client device, a request for a web page. And the web server application is configured to respond to the request by (i) querying the database to ascertain a component tree-structure representing the hierarchical arrangement of the components of the web page and to ascertain the data-bindings between the components of the web page, (ii) based on the ascertained component tree-structure and data-bindings, constructing a markup document that represents the ascertained component tree-structure and data-bindings and includes a component loader operative to load the underlying scripts, and (iii) outputting the constructed markup document for rendering by a web browser executing on the client device.

In line with the discussion above, the web server application could be further configured to receive user input declaring the structure and operation of the web page, including declarations of the hierarchical arrangement of the components of the web page and the data-bindings between the components of the web page. And the web server application could be configured to respond to the user input by generating and storing, cooperatively in a plurality of tables of the database, the plurality of interrelated records cooperatively defining the hierarchical arrangement of the components of the web page and the plurality of interrelated records cooperatively defining the data-bindings between the components of the web page, to facilitate the querying and constructing.

Further, the web server application could be configured to provide a user interface through which to receive the user input declaring the structure and operation of the web page. For instance, the user interface could define a menu of components and could enable user selection, from the menu of components, of components to be included on the web page and user designation of hierarchy and data-bindings between the components. In a representative implementation, each such component, including the underlying scripts interpretable to define the structure and operation of the components, could be defined in advance of receiving the user input. With this arrangement, the underlying scripts could expose APIs of the components, and the declarations could make use of the exposed APIs. Further, the underlying scripts could be swappable while maintaining the exposed APIs.

Also in line with the discussion above, the interrelated records of the database could include a root-element record, a plurality of page-element records, a plurality of component records, and a plurality of data-binding records. The root-element record could defined a top level of the web page. The plurality of page-element records could cooperatively define the component tree structure of the components of the web page, with each page-element record including a component-reference that references a respective one of the component records and including a parent-reference that references an associated parent node of the tree structure.

Each component record could define a respective component of the web page and could include a script-reference that references associated underlying script that is interpretable by the web browser to define structure and operation of the component. And the data-binding records could define data-bindings between (i) actions to be published by certain components of the web page and (ii) reactions of other components of the web page.

With this arrangement, the act of querying the database to ascertain the component tree-structure defining the hierarchical arrangement of the components of the web page could involve querying the database to identify the root-element record of the web page and recursively querying the database based on the parent-references in the page-element records, to establish the component-tree structure defining the hierarchical arrangement of the components of the web page.

Further, as shown in FIG. 13, in an example implementation, the data-binding records could include (i) action records defining the actions to be published by the components of the web page, (ii) properties records defining properties of the components of the web page, and (iii) action-binding records defining data-binding between the actions defined by the actions records and the properties defined by the properties records. With this arrangement, the act of querying the database to ascertain the data-bindings between the components of the web page could involve querying the action-binding records to determine the defined data-bindings.

In addition, the act of constructing the markup document that represents the ascertained component tree-structure and data-bindings could involve structuring the markup document to include a hierarchical set of declarations corresponding with the ascertained component tree-structure, and to include associated tags defining the ascertained data-bindings. Further, the act of constructing the markup document that includes the component loader operative to load the underlying scripts could involve ascertaining, from the script-references of the component records, the underlying scripts interpretable to define the structure and operation of the components of the web page, and structuring the markup document to have the component loader reference the ascertained underlying scripts.

In addition, as discussed above, the system could cache ascertained component tree-structures and data-bindings for efficiency. For instance, the request for the web page could be considered a first request, and the web server application could be further configured to carry out caching operations with respect to that request, to facilitate efficient response to a later, second request for the same page.

In an example implementation, for instance, after the web server application ascertains the component tree-structure and data-bindings between the components of the web page, the web server application could cache the ascertained component tree-structure and data-bindings in data storage (internal or external) for later retrieval. For instance, the web server application could store the ascertained component tree-structure and data-bindings in Java data objects in the data storage.

Thereafter, the web server application could receive a second request for the web page. And in response to the second request, the web server application could (i) retrieve the cached component tree-structure and data-bindings from the data storage, (ii) based on the retrieved component tree-structure and data-bindings, construct a second markup document that represents the retrieved component tree-structure with data-bindings and includes the component loader operative to load the underlying scripts, and (iii) output the constructed second markup document for rendering.

Figure 16:
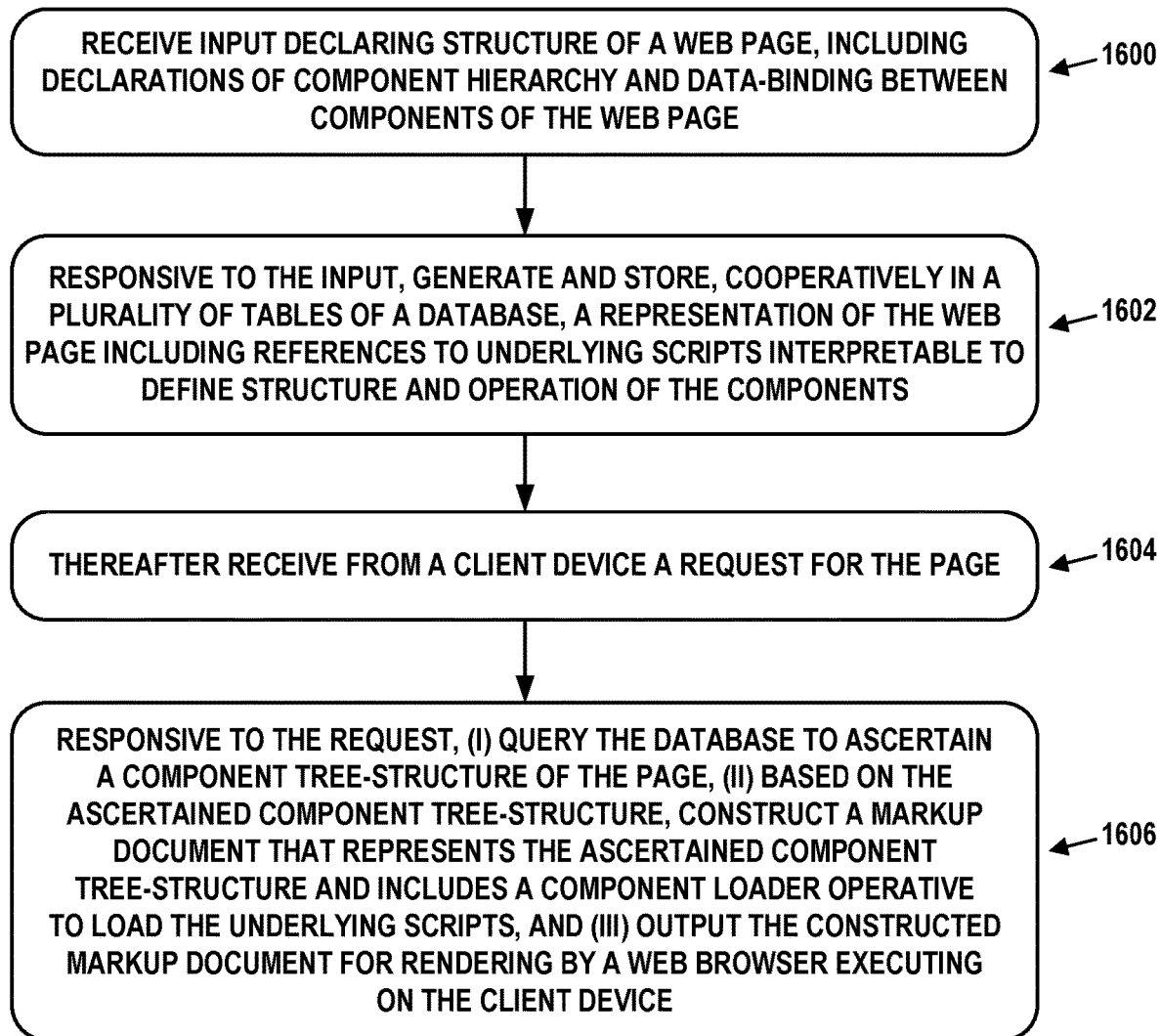
FIG. 16 is a flow chart, in accordance with example embodiments.

FIG. 16 is a flow chart illustrating an example embodiment. The process illustrated by FIG. 16 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 16 may be simplified by the removal of any one or more of the features shown therein. Further, these embodiments may be combined with features, aspects, and/or implementations of any of the previous figures or otherwise described herein.

According to FIG. 16, at block 1600, the process includes a web server application (e.g., executing on a computing device) receiving input declaring structure of a web page, including declarations of component hierarchy and data-bindings between components of the web page. Further, at block 1602, the process includes, responsive to the input, generating and storing, cooperatively in a plurality of tables of a database, a representation of the web page including references to underlying scripts interpretable to define structure and operation of the components.

At block 1604, the process then includes the web server application thereafter receiving, from a client device, a request for the web page. And at block 1606, the process includes, responsive to the request, (i) querying the database to ascertain a component tree-structure of the page, (ii) based on the ascertained component tree-structure, constructing a markup document that represents the ascertained component tree-structure and includes a component loader operative to load the underlying scripts, and (iii) outputting the constructed markup document for rendering by a web browser executing on the client device.

In line with the discussion above, the generating and storing cooperatively in the plurality of tables of the database the representation of the web page could involve generating and storing a plurality of interrelated records cooperatively defining the component hierarchy and a plurality of interrelated records cooperatively defining data-bindings.

For instance, the interrelated records could include a root-element record, a plurality of page-element records, a plurality of component records, and a plurality of data-binding records, which could be defined as discussed above. And the act of querying the database to ascertain the component tree-structure of the web page could involve querying the database to identify the root-element record of the web page, and recursively querying the database based on the parent-references in the page-element records, to establish the component-tree structure of the web page.

Figure 17:
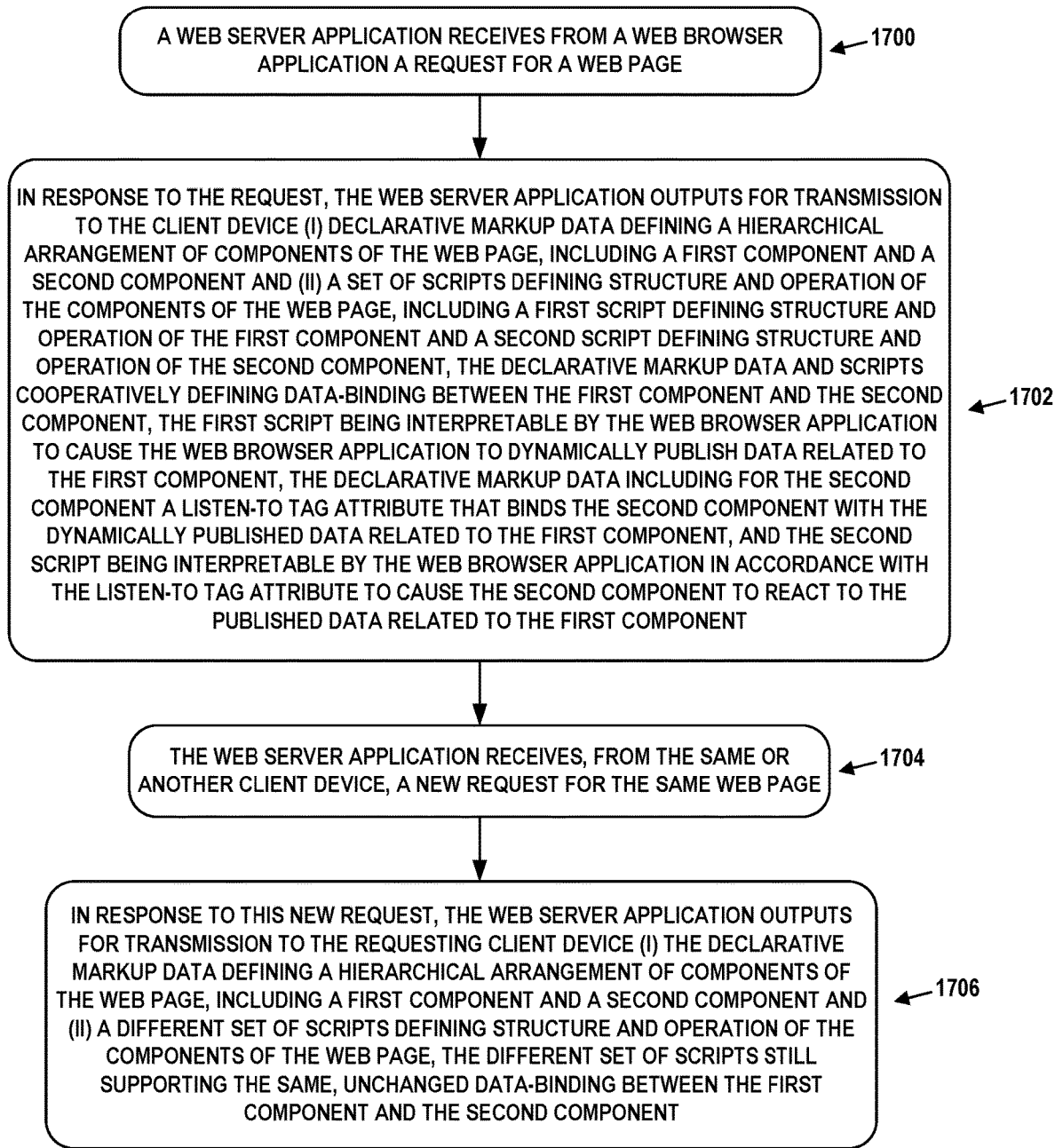
FIG. 17 is another flow chart, in accordance with example embodiments.

FIG. 17 is a flow chart illustrating an example embodiment for delivery of web page content by a web server. The process illustrated by FIG. 17 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

As shown in FIG. 17, at block 1700, a web server application executing on the computing device receives from a web browser application executing on a client device a request for a web page.

At block 1702, in response to the request, the web server application outputs for transmission to the client device (i) declarative markup data defining a hierarchical arrangement of components of the web page, including a first component and a second component and (ii) a set of scripts defining structure and operation of the components of the web page, including a first script (one or more scripts) defining structure and operation of the first component and a second script (one or more scripts) defining structure and operation of the second component.

In line with the discussion above, the declarative markup data and scripts cooperatively define data-binding between the first component and the second component. For instance, the first script could be interpretable by the web browser application to cause the web browser application to dynamically publish data related to the first component, the declarative markup data could include for the second component a listen-to tag attribute that binds the second component with the dynamically published data related to the first component, and the second script could be interpretable by the web browser application in accordance with the listen-to tag attribute to cause the second component upon to react to the published data related to the first component.

Thereafter, at block 1704, the web server application receives, from the same or another client device, a new request for the same web page. But in the meantime, one or more of the scripts underlying one or more of the components of the web page has changed. Therefore, at block 1706, in response to this new request, the web server application outputs for transmission to the requesting client device (i) the declarative markup data defining a hierarchical arrangement of components of the web page, including a first component and a second component and (ii) a different set of scripts defining structure and operation of the components of the web page, the different set of scripts still supporting the same, unchanged data-binding between the first component and the second component.

Further in line with the discussion above, the process of FIG. 17 could additionally involve the web server application generating the declarative markup data based on a database representation of the web page. And the second set of scripts could include a different first script defining structure and operation of the first component and/or a different second script defining structure and operation of the second component.

D. Example System for Receiving and Rendering Web Pages

In an example implementation, computing device 100 could alternatively or additionally be configured to carry out various web browser operations described above. In particular, the computing device could include a processing unit such as processor 102, data storage such as memory 104, a network communication interface such as network interface 106, and other features as described. The data storage could then store program instructions in line with the discussion above, which could define a web browser application executable by the processing unit to carry out the various web browser operations.

For instance, the web browser operations could include receiving, in response to a request for a web page, (i) declarative markup data defining a hierarchical arrangement of components of the web page, including a first component and a second component, and (ii) a set of scripts defining structure and operation of the components of the web page, including a first script defining structure and operation of the first component and a second script defining structure and operation of the second component. Further, the web browser operations could include establishing a DOM of the web page, perhaps including populating, based on the received scripts, shadow DOMs of the components of the web page. And the web browser operations could include rendering the web page based on the established DOM.

In line with the discussion above, the declarative markup data and scripts that the web browser application receives could cooperatively define data-binding between the first component and the second component. For instance, the first script could be interpretable by the web browser application to cause the web browser application to dynamically publish data related to the first component, the declarative markup data could include for the second component a listen-to tag attribute that binds the second component with the dynamically published data related to the first component, and the second script could be interpretable by the web browser application in accordance with the listen-to tag attribute to cause the second component to react to the published data related to the first component.

As further discussed above, the request in this arrangement could be considered a first request and the set of scripts could be considered a first set of scripts. And the web browser operations could additionally include receiving, in response to a second, subsequent request for the same web page, (i) the declarative markup data defining the hierarchical arrangement of the components of the web page and (ii) a second set of scripts defining structure and operation of the components of the web page, the second set of scripts being different than the first set of scripts while still supporting the same, unchanged data-binding between the first component and the second component. Further, with this implementation, the second set of scripts could include a different first script defining structure and operation of the first component and/or a different second script defining structure and operation of the second component.

In an example implementation, the hierarchical arrangement of the components of the web page could define parent and child relationships among the components, as a tree of components, possibly using shadow DOMs to define relationships between parent and child components. With such an arrangement, the first and second components could be sibling components that share a common parent component in the hierarchical arrangement or could be related in a different way.

Further, as discussed above, the operation of receiving the declarative markup data and scripts could involve (i) receiving the declarative markup data and one or more references to the scripts and (ii) using the one or more references to request and receive the scripts. For instance, the web browser application could receive a markup document that includes the declarative markup data and further includes one or more references to the scripts, and the web browser application could use the one or more references to obtain the scripts, such as by sending one or more requests to URLs defined by the one or more references.

Figure 18:
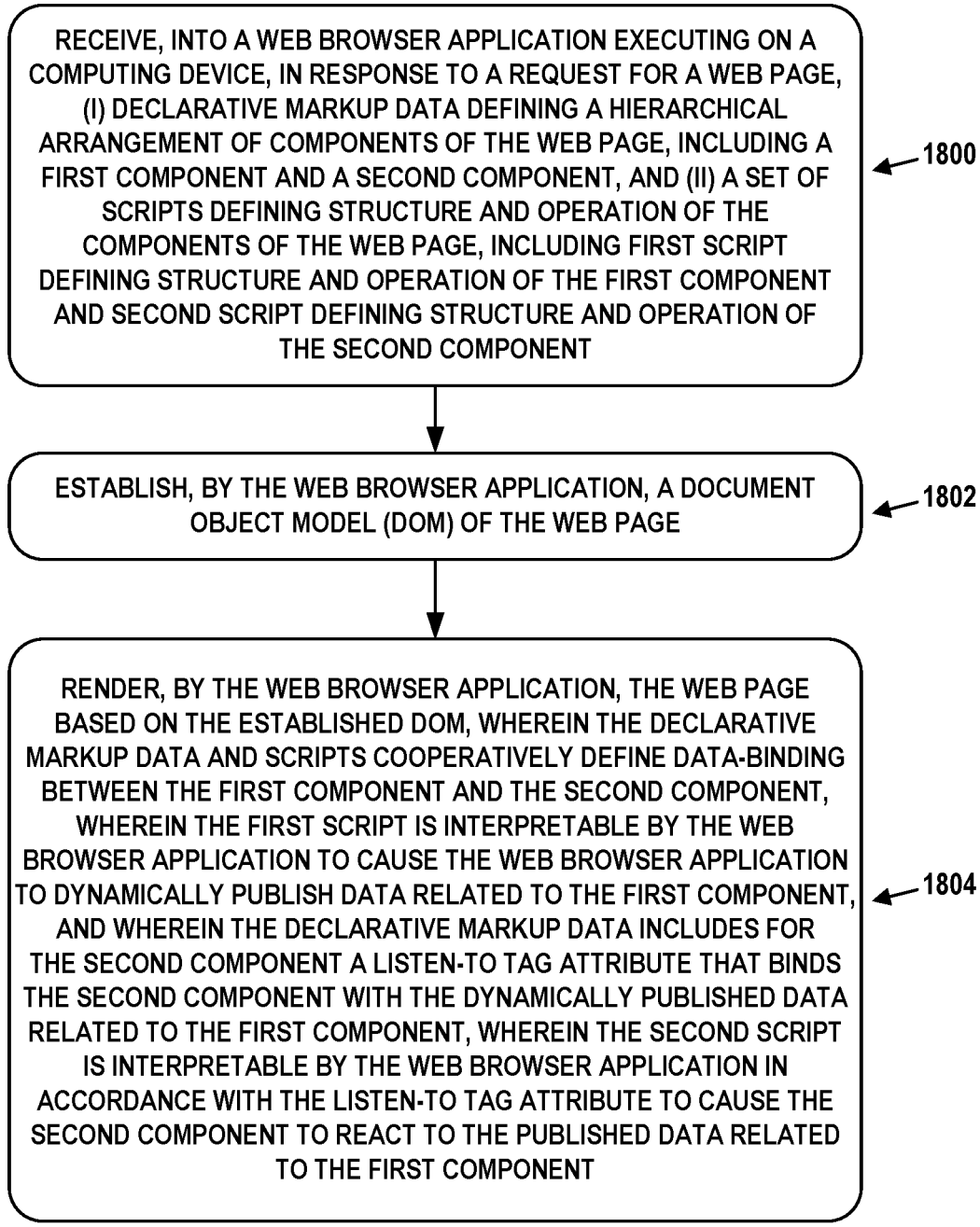
FIG. 18 is yet another flow chart, in accordance with example embodiments.

FIG. 18 is a flow chart illustrating an example embodiment. The process illustrated by FIG. 18 may be carried out by a computing device, such as computing device 100 as noted above or by other types of devices or device subsystems. For example, the process could be carried out by a portable computer, such as a laptop or a tablet device.

According to FIG. 18, at block 1800, the process includes receiving into a web browser application executing on a computing device, in response to a request for a web page, (i) declarative markup data defining a hierarchical arrangement of components of the web page, including a first component and a second component, and (ii) a set of scripts defining structure and operation of the components of the web page, including a first script defining structure and operation of the first component and a second script defining structure and operation of the second component.

Further, at block 1802, the process includes establishing, by the web browser application, a DOM of the web page based at least on the received scripts, perhaps including populating, by the web browser application, based on the received scripts, shadow DOMs of the components of the web page. And at block 1804, the process includes rendering, by the web browser application, the web page based on the established DOM.

As illustrated in block 1804 and in line with the discussion above, the declarative markup data and scripts in this process cooperatively define data-binding between the first component and the second component, with the first script being interpretable by the web browser application to cause the web browser application to dynamically publish data related to the first component, the declarative markup data including for the second component a listen-to tag attribute that binds the second component with the dynamically published data related to the first component, and the second script being interpretable by the web browser application in accordance with the listen-to tag attribute to cause the second component to react to the published data related to the first component.

The embodiments of FIG. 18 may be simplified by the removal of any one or more of the features shown therein. Further, these embodiments may be combined with features, aspects, and/or implementations of any of the previous figures or otherwise described herein. For instance, various features described could be implemented by an article of manufacture that includes a non-transitory computer-readable medium having stored thereon program instructions that, upon execution by a computing system, cause the computing system to perform the described web browser operations.

VI. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system, comprising:
one or more hardware processors; and
a non-transitory memory storing instructions that, when executed by the one or more hardware processors, causes the one or more hardware processors to perform actions comprising:
providing, to a client device, a graphical user interface (GUI) configured to display:
a plurality of components, wherein each component of the plurality of components is defined by an underlying script; and
a property for each component of the plurality of components, wherein the GUI is configured to allow selection of a state of the property from a plurality of states comprising a static state and a dynamic state;
receiving, from the client device, via the GUI, a selection of two or more components of the plurality of components, a data-binding between the two or more components, and an input defining a hierarchical arrangement of the two or more components, wherein the selection, the data-binding, and the hierarchical arrangement indicate a structure of a web page;
generating one or more database records indicative of the selection, the data-binding, and the hierarchical arrangement, wherein the one or more database records comprise a reference to each respective underlying script of the two or more components of the plurality of components; and
storing the one or more database records in a database.

2. The system of claim 1, wherein the property having the dynamic state is configured to update based on a listen-to functionality of the component.

3. The system of claim 2, wherein the data-binding between the two or more components binds the property having the dynamic state of a subscriber component of the two or more components to published data of a publisher component of the two or more components.

4. The system of claim 3, wherein the GUI is configured to display, for the publisher component, one or more selectable actions configured to publish the data for receipt by the subscriber component.

5. The system of claim 1, wherein the GUI is configured to expose one or more application programming interface (API) points of each component of the plurality of components, wherein the one or more API points of each component specify one or input data types configured to support the underlying script defining each component, or one or more output data types configured to support the underlying script defining each component, or both, and wherein the data-binding between the two or more components is between respective API points of the two or more components.

6. The system of claim 1, wherein the two or more components comprise three or more components, and wherein the three or more components comprise a publisher component and a plurality of subscriber components, and wherein the plurality of subscriber components are configured to dynamically update in response published data of the publisher component.

7. The system of claim 1, wherein the one or more database records comprise:
   a root element record identifying the web page;
   a plurality of component records comprising references to the two or more components, wherein each component record comprises the reference to the respective underlying script of a respective component of the two or more components; and
   a plurality of page element records defining a component structure of the two or more components, wherein each page element record comprises a secondary reference to a respective component record of the plurality of component records, and wherein the plurality of page element records are tied to the root element record.

8. The system of claim 7, wherein the actions comprise associating a uniform resource locator (URL) corresponding to a configuration of the web page with the root element record identifying the web page.

9. The system of claim 1, wherein the one or more database records cooperatively form a document object model (DOM) tree representation of the web page.

10. A method, comprising:
    providing, to a client device, a graphical user interface (GUI) configured to display:
       a plurality of components, wherein each component of the plurality of components is defined by an underlying script; and
       a property for each component of the plurality of components, wherein the GUI is configured to allow selection of a state of the property from a plurality of states comprising a static state and a dynamic state;
    receiving, from the client device, via the GUI, a selection of two or more components of the plurality of components, a data-binding between the two or more components, and an input defining a hierarchical arrangement of the two or more components, wherein the selection, the data-binding, and the hierarchical arrangement indicate a structure of a web page;
    generating one or more database records indicative of the selection, the data-binding, and the hierarchical arrangement, wherein the one or more database records comprise a reference to each respective underlying script of the two or more components of the plurality of components; and
    storing the one or more database records in a database.

11. The method of claim 10, wherein the property having the dynamic state is configured to update based on a listen-to functionality of the component.

12. The method of claim 11, wherein the data-binding between the two or more components binds the property having the dynamic state of a subscriber component of the two or more components to published data of a publisher component of the two or more components.

13. The method of claim 12, wherein the GUI is configured to display, for the publisher component, one or more selectable actions configured to publish the data for receipt by the subscriber component.

14. The method of claim 10, wherein the GUI is configured to expose one or more application programming interface (API) points of each component of the plurality of components, wherein the one or more API points of each component specify one or input data types configured to support the underlying script defining each component, or one or more output data types configured to support the underlying script defining each component, or both, and wherein the data-binding between the two or more components is between respective API points of the two or more components.

15. A non-transitory computer-readable medium comprising computer readable instructions, that when executed by one or more processors, causes the one or more processors to perform operations comprising:
    providing, to a client device, a graphical user interface (GUI) configured to display of a plurality of components, wherein each component of the plurality of components is defined by an underlying script;
    receiving, from the client device, via the GUI, a selection of two or more components of the plurality of components, a data-binding between the two or more components, and an input defining a hierarchical arrangement of the two or more components, wherein the selection, the data-binding, and the hierarchical arrangement indicate a structure of a web page;
    generating one or more database records indicative of the selection, the data-binding, and the hierarchical arrangement, wherein the one or more database records comprise:
       a root element record identifying the web page;
       a plurality of component records comprising references to the two or more components, wherein each component record comprises a reference to the respective underlying script of a respective component of the two or more components; and
       a plurality of page element records defining a component structure of the two or more components, wherein each page element record comprises a secondary reference to a respective component record of the plurality of component records, and wherein the plurality of page element records are tied to the root element record; and
    storing the one or more database records in a database.

16. The non-transitory computer-readable medium of claim 15, wherein the GUI is configured to display, for each component of the plurality of components, a property configured to be set as a static property or a dynamic property, and wherein the dynamic property is configured to update based on a listen-to functionality of the component.

17. The non-transitory computer-readable medium of claim 16, wherein the GUI is configured to display, for a publisher component of the two or more components, one or more selectable actions configured to publish data for receipt by a subscriber component of the two or more components.

18. The non-transitory computer-readable medium of claim 15, wherein the one or more database records cooperatively form a document object model (DOM) tree representation of the web page.

19. The non-transitory computer-readable medium of claim 15, wherein the operations comprise associating a uniform resource locator (URL) corresponding to a configuration of the web page with the root element record identifying the web page.

20. The system of claim 1, wherein the property having the static state comprises one or more static attribute values.

\* \* \* \* \*